US012804661B2

(12) United States Patent
Tie et al.

(10) Patent No.: US 12,804,661 B2
(45) Date of Patent: Nov. 17, 2026

(54) DCI SENDING METHOD, DCI RECEIVING METHOD, AND RELATED APPARATUS

(71) Applicant: HUAWEI TECHNOLOGIES CO., LTD., Shenzhen (CN)

(72) Inventors: Xiaolei Tie, Shanghai (CN); Meng Hua, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 497 days.

(21) Appl. No.: 17/671,640

(22) Filed: Feb. 15, 2022

(65) Prior Publication Data

US 2022/0174652 A1 Jun. 2, 2022

Related U.S. Application Data

(63) Continuation of application No. PCT/CN2019/101216, filed on Aug. 16, 2019.

(51) Int. Cl.
*H04W 4/00* (2018.01)
*H04W 72/23* (2023.01)

(52) U.S. Cl.
CPC .................................. *H04W 72/23* (2023.01)

(58) Field of Classification Search
CPC . H04W 72/23; H04W 76/28; H04W 52/0216; H04W 52/0219; H04W 52/0229;
(Continued)

(56) References Cited

U.S. PATENT DOCUMENTS

2011/0075684 A1* 3/2011 Zeng ..................... H04L 1/1861 370/475
2014/0050133 A1* 2/2014 Jafarian .............. H04W 74/085 370/311

(Continued)

FOREIGN PATENT DOCUMENTS

CN 108632960 A 10/2018
CN 108696919 A 10/2018

(Continued)

OTHER PUBLICATIONS

R1-1719832, Huawei et al, Designs for UE power saving, 3GPP TSG RAN WG1 Meeting #91, Reno, USA, Nov. 27-Dec. 1, 2017, total 3 pages.

(Continued)

*Primary Examiner* — Edan Orgad
*Assistant Examiner* — Hidayat Dabiri
(74) *Attorney, Agent, or Firm* — Rimon PC

(57) ABSTRACT

In the present disclosure, a network device determines a piece of downlink control information that includes indication information and m information blocks. The indication information is for b terminal devices. A first information block in the m information blocks corresponds to a first terminal device in the b terminal devices and the first information block is used to indicate energy-saving information of the first terminal device. A second information block in the m information blocks corresponds to a second terminal device in the b terminal devices and the second information block is used to indicate energy-saving information of the second terminal device. A length of the first information block is different from a length of the second information block, and m≤b.

20 Claims, 10 Drawing Sheets

(58) Field of Classification Search
CPC .. H04W 52/028; H04L 5/0037; H04L 5/0094; H04L 5/0053; Y02D 30/70
See application file for complete search history.

(56) References Cited

U.S. PATENT DOCUMENTS

| | | | | |
|---|---|---|---|---|
| 2015/0264708 | A1* | 9/2015 | Li | H04L 1/1887 370/329 |
| 2017/0099664 | A1* | 4/2017 | Lunttila | H04L 1/1819 |
| 2017/0318566 | A1 | 11/2017 | Deogun et al. | |
| 2018/0123769 | A1* | 5/2018 | Pelletier | H04L 5/001 |
| 2019/0200333 | A1* | 6/2019 | Pajukoski | H04W 72/23 |
| 2021/0314866 | A1* | 10/2021 | Lee | H04W 52/0229 |
| 2021/0377882 | A1* | 12/2021 | Shi | H04W 56/0015 |
| 2022/0086762 | A1* | 3/2022 | Xu | H04W 52/0235 |
| 2022/0182936 | A1* | 6/2022 | Maleki | H04W 72/23 |
| 2022/0240187 | A1* | 7/2022 | Guo | H04W 52/0229 |
| 2022/0295404 | A1* | 9/2022 | Wang | H04W 52/0235 |

FOREIGN PATENT DOCUMENTS

| | | | | |
|---|---|---|---|---|
| CN | 109963339 | A | 7/2019 | |
| WO | WO-2014189418 | A1 * | 11/2014 | H04W 28/20 |
| WO | WO-2018149348 | A1 * | 8/2018 | H04W 52/02 |
| WO | WO-2018231016 | A1 * | 12/2018 | H04L 5/0044 |
| WO | WO-2019080555 | A1 * | 5/2019 | H04W 48/08 |

OTHER PUBLICATIONS

Samsung et al.,"PDCCH-based power saving signal/channel",R1-1906980,total:3GPP TSG RAN WG1 #97,Reno,USA, May 13-17, 2019,total:12pages.

3GPP TSG RAN WG1 #97, Reno, USA, May 13-17, 2019, R1-1907345, "Design of PDCCH-based Power Saving Signal and Channel," Apple Inc.; 12 total pages.

* cited by examiner

DCI SENDING METHOD, DCI RECEIVING METHOD, AND RELATED APPARATUS

CROSS-REFERENCE TO RELATED APPLICATIONS

This application is a continuation of International Application No. PCT/CN2019/101216, filed on Aug. 16, 2019, the disclosure of which is hereby incorporated by reference in its entirety.

TECHNICAL FIELD

This application relates to the field of communication technologies, and in particular, to a Downlink Control Information (DCI) sending method, a DCI receiving method, and a related apparatus.

BACKGROUND

With continuous development of science and technology, intelligent terminal devices are rapidly developing. For example, mobile phones have been incorporated into many aspects of people's lives. However, energy savings and improvements to battery lives for terminal devices are constantly being improved. In an existing communication system, a discontinuous reception (DRX) mechanism is usually used to reduce power consumption of user equipment (UE).

In a 5th generation (5G for short, which is also referred to as new radio, a new air interface, or NR for short) cellular mobile communication system, a wake-up signal function based on a physical downlink control channel (PDCCH) is planned to be introduced in a power-saving feature in Release 16, and works in user equipment (UE) for which a DRX state is configured. The UE for which the DRX state is configured is in a connected mode in the NR system. When a base station does not schedule the UE, the UE enters a sleep mode of the DRX mechanism to save and/or reduce power consumption. During a wake-up mode of the DRX mechanism, the UE performs blind detection on downlink control information (DCI). If the scheduling DCI sent to the UE is not detected, the UE switches to the sleep mode after the wake-up mode ends. If the scheduling DCI sent to the UE is detected, the UE restarts a DRX-inactivity timer after detecting the scheduling DCI that is initially transmitted, and switches to the sleep mode after the timer expires. The UE continuously performs blind detection on the scheduling DCI sent to the UE during the wake-up mode. However, in most cases in the NR system, the base station does not send the scheduling DCI to the UE when the UE is in the wake-up mode. Consequently, power consumption of the UE is high.

SUMMARY

Embodiments of this application provide a DCI sending method, a DCI receiving method, and a related apparatus. UE can monitor a downlink control channel PDCCH based on energy-saving information indicated by a corresponding information block in DCI. This reduces power consumption of the UE.

According to a first aspect, an embodiment of this application provides a downlink control information (DCI) sending method. The method includes: determining DCI, where the DCI includes indication information and m information blocks, where the indication information is used to indicate information for b terminal devices, a first information block in the m information blocks corresponds to a first terminal device in the b terminal devices, the first information block is used to indicate energy-saving information of the first terminal device, a second information block in the m information blocks corresponds to a second terminal device in the b terminal devices, the second information block is used to indicate energy-saving information of the second terminal device, a length of the first information block is different from a length of the second information block, and $m \leq b$; and sending the DCI.

In the foregoing method, the length of the first information block corresponding to the first terminal device is different from the length of the second information block corresponding to the second terminal device, so that information blocks with different lengths can be determined for different terminal devices. This improves adaptability of the information blocks in the DCI. In addition, a network device may determine corresponding information blocks for m terminal devices in the b terminal devices. The information blocks are used to indicate energy-saving information of the terminal devices, the DCI may indicate to a terminal device in the m terminal devices to obtain the corresponding information block from the DCI, and monitor a PDCCH based on energy-saving information indicated in the information block. In this way, a blind detection operation does not need to be performed. This can reduce power consumption of a terminal device.

With reference to the first aspect, in a possible implementation of the first aspect, the indication information indicates a transmission location of the first information block and/or a transmission location of the second information block by using a bitmap.

Optionally, the indication information indicates the transmission location of the first information block by using a location of the first terminal device in the bitmap and a state of the bitmap and/or indicates the transmission location of the second information block by using a location of the second terminal device in the bitmap and a state of the bitmap.

In the foregoing method, the indication information indicates location information of the first information block and/or location information of the second information block by using the bitmap, and may indicate to the terminal device to quickly obtain a location of a corresponding information block by using the bitmap and extract the corresponding information block. This can improve efficiency of obtaining an information block by the terminal device.

With reference to the first aspect, in a possible implementation of the first aspect, the indication information is used to indicate a transmission location of each of the m information blocks.

With reference to the first aspect, in a possible implementation of the first aspect, before the sending the DCI, the method further includes: sending a configuration message, where the configuration message carries at least one of length information of the bitmap and location information of the bitmap in the DCI.

Optionally, the configuration message is carried in Radio Resource Control (RRC) signaling or physical layer signaling.

In the foregoing method, before sending the DCI, the network device sends the configuration message carrying the bitmap. In this way, the network device first sends the bitmap to indicate to a related terminal device that receives the configuration message to obtain a corresponding information block based on the bitmap. This improves accuracy and efficiency of obtaining an information block.

With reference to the first aspect, in a possible implementation of the first aspect, a mapping relationship between a transmission location and a location of a terminal device in the bitmap is as follows:

$$P=\sum_{i=0}^{N-1}L_i+\sum_{i=0}^{X-1}W_iZ_i+Z_{WIF_X}*I_X,$$

where

P is the transmission location, $L_i$ is a bit length of a $WIF_i$, $W_i$ is a quantity of indication information in the $WIF_i$, $Z_i$ is a bit length of an information block in an $MRB_i$, X is a number of a WIF in which the terminal device is located, $I_x$ is a location of indication information corresponding to the terminal device in the $WIF_X$, $Z_{WIF_X}$ is a bit length of an $MRB_X$ corresponding to the $WIF_X$, the $WIF_i$ is an $i^{th}$ bitmap field, an $MRB_i$ is an $i^{th}$ information block field in the DCI, a location of the indication information is the location of the terminal device in the bitmap, and i and N are positive integers.

With reference to the first aspect, in a possible implementation of the first aspect, a mapping relationship between a transmission location and a location of a terminal device in the bitmap is as follows:

$$P=\sum_{i=0}^{N-1}L_i+\sum_{i=0}^{(X-offset-1)modN}W_{(offset+i)modN}Z_{(offset+i)modN}+Z_{WIF_X}*I_X,$$

where

P is the transmission location, $L_i$ is a bit length of a $WIF_i$, $W_{(offset+i)mod\ N}$ is a quantity of indication information in the $WIF_i$, $Z_{(offset+i)mod\ N}$ is a bit length of an information block in an $MRB_i$, X is a number of a WIF in which the terminal device is located, $I_x$ is a location of indication information corresponding to the terminal device in the $WIF_X$, $Z_{WIF_X}$ is a bit length of an $MRB_X$ corresponding to the $WIF_X$, the $WIF_i$ is an $i^{th}$ bitmap field, an $MRB_i$ is an $i^{th}$ information block field in the DCI, a location of the indication information is the location of the terminal device in the bitmap, an offset is a start location that is randomly generated, N is a quantity of WIFs, and i and N are positive integers.

According to a second aspect, an embodiment of this application provides a downlink control information (DCI) receiving method. The method includes:

receiving downlink control information (DCI), where the DCI includes indication information and m information blocks, the indication information is used to indicate b terminal devices, a first terminal device is one of the b terminal devices, a first information block in the m information blocks corresponds to the first terminal device, the first information block is used to indicate energy-saving information of the first terminal device, the lengths of at least two information blocks in the m information blocks are different, and m≤b; and monitoring a physical downlink control channel (PDCCH) based on the first information block.

In the foregoing method, the DCI includes m information blocks, the lengths of at least two information blocks in the m information blocks are different, and the lengths of the information blocks corresponding to at least two terminal devices are different. This can improve adaptability of the DCI during setup. The terminal device monitors the PDCCH based on the energy-saving information indicated by the corresponding first information block in the m information blocks, and a blind detection operation does not need to be performed. This can reduce power consumption of the terminal devices.

With reference to the second aspect, in a possible implementation of the second aspect, the indication information indicates a transmission location of the first information block by using a bitmap.

Optionally, the indication information indicates the transmission location of the first information block by using a location of the first terminal device in the bitmap and a state of the bitmap.

With reference to the second aspect, in a possible implementation of the second aspect, the indication information is used to indicate a transmission location of each of the m information blocks.

With reference to the second aspect, in a possible implementation of the second aspect, before receiving the DCI, the method further includes: receiving a configuration message, where the configuration message carries the length information of the bitmap or the location information of the bitmap in the DCI or both.

Optionally, the configuration message is carried in RRC signaling or physical layer signaling.

With reference to the second aspect, in a possible implementation of the second aspect, a mapping relationship between a transmission location and a location of a terminal device in the bitmap is as follows:

$$P=\sum_{i=0}^{N-1}L_i+\sum_{i=0}^{X-1}W_iZ_i+Z_{WIF_X}*I_X,$$

where

P is the transmission location, $L_i$ is a bit length of a $WIF_i$, $W_i$ is a quantity of indication information in the $WIF_i$, $Z_i$ is a bit length of an information block in an $MRB_i$, X is a number of a WIF in which the terminal device is located, $I_x$ is a location of indication information corresponding to the terminal device in the $WIF_X$, $Z_{WIF_X}$ is a bit length of an $MRB_X$ corresponding to the $WIF_X$, the $WIF_i$ is an $i^{th}$ bitmap field, an $MRB_i$ is an $i^{th}$ information block field in the DCI, a location of the indication information is the location of the terminal device in the bitmap, and i and N are positive integers.

With reference to the second aspect, in a possible implementation of the second aspect, a mapping relationship between a transmission location and a location of a terminal device in the bitmap is as follows:

$$P=\sum_{i=0}^{N-1}L_i+\sum_{i=0}^{(X-offset-1)modN}W_{(offset+i)modN}Z_{(offset+i)modN}+Z_{WIF_X}*I_X,$$

where

P is the transmission location, $L_i$ is a bit length of a $WIF_i$, $W_{(offset+i)mod\ N}$ is a quantity of indication information in the $WIF_i$, $Z_{(offset+i)mod\ N}$ is a bit length of an information block in an $MRB_i$, X is a number of a WIF in which the terminal device is located, $I_x$ is a location of indication information corresponding to the terminal device in the $WIF_X$, $Z_{WIF_X}$ is a bit length of an $MRB_X$ corresponding to the $WIF_X$, the $WIF_i$ is an $i^{th}$ bitmap field, an $MRB_i$ is an $i^{th}$ information block field in the DCI, a location of the indication information is the location of the terminal device in the bitmap, an offset is a start location that is randomly generated, N is a quantity of WIFs, and i and N are positive integers.

According to a third aspect, an embodiment of this application provides a communication apparatus, including a processing module and a transceiver module.

The processing module is configured to determine downlink control information (DCI), where the DCI includes indication information and m information blocks and the indication information is used to indicate b terminal devices. A first information block in the m information blocks corresponds to a first terminal device in the b terminal devices, the first information block is used to indicate energy-saving information of the first terminal device, a second information block in the m information blocks corresponds to a second terminal device in the b terminal devices. the second information block is used to indicate energy-saving information of the second terminal device, a length of the first information block is different from a length of the second information block, and m≤b.

The transceiver module is configured to send the DCI.

With reference to the third aspect, in a possible implementation of the third aspect, the indication information indicates a transmission location of the first information block and/or a transmission location of the second information block by using a bitmap.

Optionally, the indication information indicates the transmission location of the first information block by using a location of the first terminal device in the bitmap and a state of the bitmap and/or indicates the transmission location of the second information block by using a location of the second terminal device in the bitmap and a state of the bitmap.

With reference to the third aspect, in a possible implementation of the third aspect, the indication information is used to indicate a transmission location of each of the m information blocks.

With reference to the third aspect, in a possible implementation of the third aspect, before sending the DCI, the transceiver module is further configured to send a configuration message, where the configuration message carries at least one of the length information of the bitmap and the location information of the bitmap in the DCI.

Optionally, the configuration message is carried in RRC signaling or physical layer signaling.

With reference to the third aspect, in a possible implementation of the third aspect, a mapping relationship between a transmission location and a location of a terminal device in the bitmap is as follows:

$$P = \sum_{i=0}^{N-1} L_i + \sum_{i=0}^{X-1} W_i Z_i + Z_{WIF_X} * I_X,$$

where

P is the transmission location, $L_i$ is a bit length of a $WIF_i$, $W_i$ is a quantity of indication information in the $WIF_i$, $Z_i$ is a bit length of an information block in an $MRB_i$, X is a number of a WIF in which the terminal device is located, $I_x$ is a location of indication information corresponding to the terminal device in the $WIF_X$, $Z_{WIF_X}$ is a bit length of an $MRB_X$ corresponding to the $WIF_X$, the $WIF_i$ is an $i^{th}$ bitmap field, an $MRB_i$ is an $i^{th}$ information block field in the DCI, a location of the indication information is the location of the terminal device in the bitmap, and i and N are positive integers.

With reference to the third aspect, in a possible implementation of the third aspect, a mapping relationship between a transmission location and a location of a terminal device in the bitmap is as follows:

$$P = \sum_{i=0}^{N-1} L_i + \sum_{i=0}^{(X-offset-1)modN} W_{(offset+i)modN} Z_{(offset+i)modN} + Z_{WIF_X} * I_X,$$

where

P is the transmission location, $L_i$ is a bit length of a $WIF_i$, $W_{(offset+i)mod\ N}$ is a quantity of indication information in the $WIF_i$, $Z_{(offset+i)mod\ N}$ is a bit length of an information block in an $MRB_i$, X is a number of a WIF in which the terminal device is located, $I_x$ is a location of indication information corresponding to the terminal device in the $WIF_X$, $Z_{WIF_X}$ is a bit length of an $MRB_X$ corresponding to the $WIF_X$, the $WIF_i$ is an $i^{th}$ bitmap field, an $MRB_i$ is an $i^{th}$ information block field in the DCI, a location of the indication information is the location of the terminal device in the bitmap, an offset is a start location that is randomly generated, N is a quantity of WIFs, and i and N are positive integers.

According to a fourth aspect, an embodiment of this application provides a communication apparatus, including a transceiver module and a monitoring module.

The transceiver module is configured to receive DCI, where the DCI includes indication information and m information blocks, the indication information is used to indicate b terminal devices, a first terminal device is one of the b terminal devices, a first information block in the m information blocks corresponds to the first terminal device, the first information block is used to indicate energy-saving information of the first terminal device, the lengths of at least two information blocks in the m information blocks are different, and m≤b.

The monitoring module is configured to monitor a physical downlink control channel (PDCCH) based on the first information block.

With reference to the fourth aspect, in a possible implementation of the fourth aspect, the indication information indicates a transmission location of the first information block by using a bitmap.

Optionally, the indication information indicates the transmission location of the first information block by using a location of the terminal device in the bitmap and a state of the bitmap.

With reference to the fourth aspect, in a possible implementation of the fourth aspect, the indication information is used to indicate a transmission location of each of the m information blocks.

With reference to the fourth aspect, in a possible implementation of the fourth aspect, before receiving the DCI, the transceiver module is further configured to receive a configuration message, where the configuration message carries at least one of the length information of the bitmap and the location information of the bitmap in the DCI.

Optionally, the configuration message is carried in RRC signaling or physical layer signaling.

With reference to the fourth aspect, in a possible implementation of the fourth aspect, a mapping relationship between a transmission location and a location of a terminal device in the bitmap is as follows:

$$P = \sum_{i=0}^{N-1} L_i + \sum_{i=0}^{X-1} W_i Z_i + Z_{WIF_X} * I_X,$$

where

P is the transmission location, $L_i$ is a bit length of a $WIF_i$, $W_i$ is a quantity of indication information in the $WIF_i$, $Z_i$ is a bit length of an information block in an $MRB_i$, X is a number of a WIF in which the terminal device is located, $I_x$ is a location of indication information corresponding to the terminal device in the $WIF_X$, $Z_{WIF_X}$ is a bit length of an $MRB_X$ corresponding to the $WIF_X$, the $WIF_i$ is an $i^{th}$ bitmap field, an $MRB_i$ is an $i^{th}$ information block field in the DCI, a location of the indication information is the location of the terminal device in the bitmap, and i and N are positive integers.

With reference to the fourth aspect, in a possible implementation of the fourth aspect, a mapping relationship between a transmission location and a location of a terminal device in the bitmap is as follows:

$$P = \sum_{i=0}^{N-1} L_i + \sum_{i=0}^{(X-offset-1)modN} W_{(offset+i)modN} Z_{(offset+i)modN} + Z_{WIF_X} * I_X,$$

where

P is the transmission location, $L_i$ is a bit length of a $WIF_i$, $W_{(offset+i)mod\ N}$ is a quantity of indication information in the $WIF_i$, $Z_{(offset+i)mod\ N}$ is a bit length of an information block in an $MRB_i$, X is a number of a WIF in which the terminal device is located, $I_x$ is a location of indication information corresponding to the terminal device in the $WIF_X$, $Z_{WIF_X}$ is a bit length of an $MRB_X$ corresponding to the $WIF_X$, the $WIF_i$ is an $i^{th}$ bitmap field, an $MRB_i$ is an $i^{th}$ information block field in the DCI, a location of the indication information is the location of the terminal device in the bitmap, an offset is a start location that is randomly generated, N is a quantity of WIFs, and i and N are positive integers.

According to a fifth aspect, an embodiment of this application provides a communication apparatus, configured to perform the DCI sending method in any one of the first aspect or the possible implementations of the first aspect. The communication apparatus may include a module configured to perform the DCI sending method in any one of the first aspect or the possible implementations of the first aspect.

According to a sixth aspect, an embodiment of this application provides a communication apparatus, including a memory, a processor, and a program that is stored in the memory and that runs on the processor. When executing the program, the processor implements the method in any one of the first aspect or the possible implementations of the first aspect.

According to a seventh aspect, an embodiment of this application provides a computer storage medium. The computer storage medium may transitory or non-transitory. The computer storage medium stores a computer program, the computer program includes program instructions, and when the program instructions are executed by a processor, the processor performs the method in any one of the first aspect or the possible implementations of the first aspect.

According to an eighth aspect, an embodiment of this application provides a communication apparatus configured to perform the DCI receiving method in any one of the second aspect or the possible implementations of the second aspect. The communication apparatus may include a module configured to perform the DCI receiving method in any one of the second aspect or the possible implementations of the second aspect.

According to a ninth aspect, an embodiment of this application provides a communication apparatus, including a memory, a processor, and a program that is stored in the memory and that runs on the processor. When executing the program, the processor implements the method in any one of the second aspect or the possible implementations of the second aspect.

According to a tenth aspect, an embodiment of this application provides a computer storage medium. The computer storage medium may be transitory or non-transitory. The computer storage medium stores a computer program, the computer program includes program instructions, and when the program instructions are executed by a processor, the processor performs the method in any one of the second aspect or the possible implementations of the second aspect.

According to an eleventh aspect, an embodiment of this application provides a communication system. The communication system includes the communication apparatus in the fifth aspect, the communication apparatus in the sixth aspect, the communication apparatus in the eighth aspect, and the communication apparatus in the ninth aspect.

These or other aspects of this application are more concise and easier to understand in description of the following embodiments.

DESCRIPTION OF EMBODIMENTS

Figure 1:
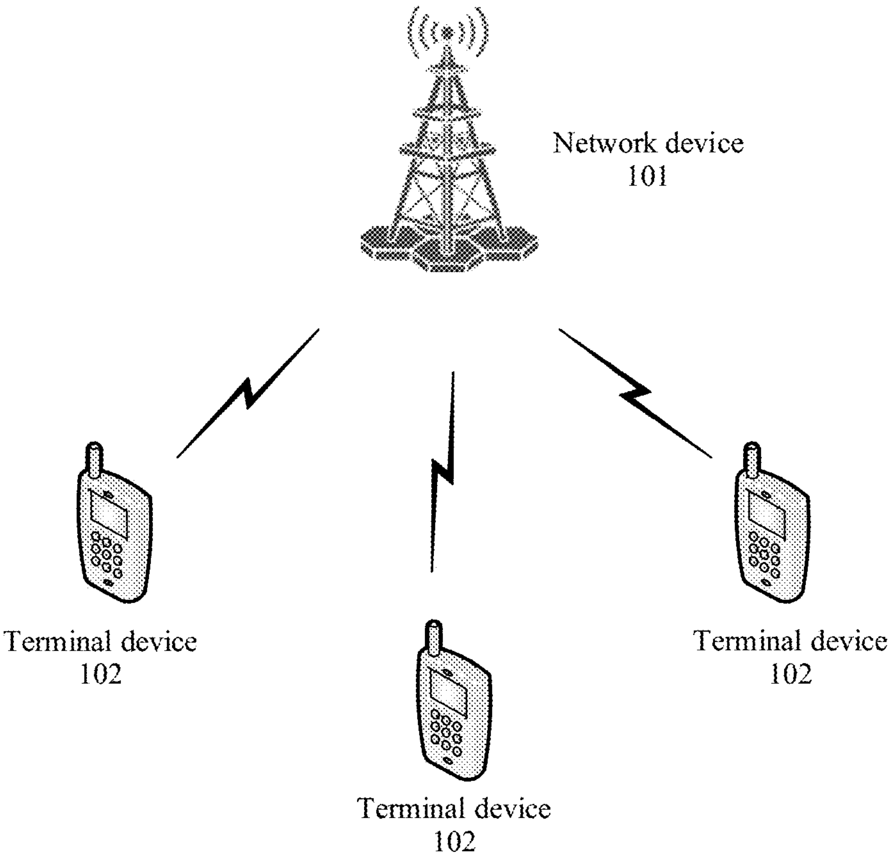
FIG. 1 is a schematic diagram of an architecture of a communication system according to an embodiment of this application.

The following describes technical solutions of this application with reference to the accompanying drawings.

In the following, some terms in embodiments of this application are described, to help a person skilled in the art have a better understanding.

It should be understood that the technical solutions in the embodiments of this application may be applied to a long term evolution (LTE) architecture, or may be applied to a universal mobile telecommunications system (UMTS) terrestrial radio access network (UTRAN) architecture, or a global system for mobile communication (GSM)/enhanced data rates for GSM evolution (EDGE) system radio access network (GSM EDGE Radio Access Network, GERAN) architecture. In the UTRAN architecture or the GERAN architecture, a function of a mobility management entity (MME) is completed by a serving general packet radio service (GPRS) support node (Serving GPRS Support Node, SGSN), and a function of an SGW/PGW is completed by a gateway GPRS support node (GGSN). The technical solutions in the embodiments of this application may further be applied to another communication system, such as a public land mobile network (PLMN) system, even a future 5G communication system or a communication system after 5G, and the like. This is not limited in the embodiments of this application.

The embodiments of this application relate to a terminal device. The terminal device includes a device that provides a user with voice and/or data connectivity, for example, may include a hand-held device with a wireless connection function, or a processing device connected to a wireless modem. The terminal device may communicate with a core network through a radio access network (RAN), and exchange voice and/or data with the RAN. The terminal device may be user equipment (UE), a wireless terminal device, a mobile terminal device, a device-to-device (D2D) terminal device, a vehicle-to-everything (V2X) terminal device, a machine-to-machine/machine-type communication (M2M/MTC) terminal device, an Internet of things (IoT) terminal device, a subscriber unit, a subscriber station, a mobile station, a remote station, an access point (AP), a remote terminal, an access terminal, a user terminal, a user agent, a user device, or the like. For example, the terminal device may include a mobile phone (or referred to as a "cellular" phone), a computer with a mobile terminal device, or a portable, pocket-sized, handheld, or computer built-in mobile apparatus. For example, the terminal device may include a device, for example, a personal communication service (PCS) phone, a cordless phone, a session initiation protocol (SIP) phone, a wireless local loop (WLL) station, a personal digital assistant (PDA), or the like. The terminal device may alternatively include a limited device, for example, a device with relatively low power consumption, a device with a limited storage capability, or a device with a limited computing capability. The terminal device may include an information sensing device such as a barcode, radio frequency identification (RFID), a sensor, a global positioning system (GPS), a laser scanner, or a terminal device in a future 5G network or a network after 5G. This is not limited in the embodiments of this application.

As an example instead of a limitation, in some embodiments of this application, the terminal device may alternatively be a wearable device. The wearable device may also be referred to as a wearable intelligent device, an intelligent wearable device, or the like, and is a generic term for wearable devices that are developed by applying wearable technologies to intelligent designs of daily wear, such as glasses, gloves, watches, clothes, and shoes. The wearable device is a portable device that can be directly worn by a user or integrated into clothes or an accessory of a user. The wearable device is not only a hardware device, but also implements a powerful function through software support, data exchange, and cloud interaction. In a broad sense, wearable intelligent devices include full-featured and large-sized devices that can implement all or a part of functions without depending on smartphones, for example, smart watches or smart glasses, and include devices that focus on only one type of application function and need to collaboratively work with other devices such as smartphones, for example, various smart bands, smart helmets, or smart jewelry for monitoring physical signs.

However, if the various terminal devices described above are located in a vehicle (for example, placed in the vehicle or mounted in the vehicle), the terminal devices may be considered as vehicle-mounted terminal devices. For example, the vehicle-mounted terminal devices are also referred to as on-board units (OBU).

Some embodiments of this application further relate to a network device. The network device may be a device configured to communicate with the terminal device. For example, the network device may be a base transceiver station (BTS) in a GSM system or a CDMA system, may be a NodeB (NB) in a WCDMA system, or may be an evolved NodeB (Evolutional NodeB, eNB or eNodeB) in an LTE system. Alternatively, the network device may be a relay station, an access point, a vehicle-mounted device, a wearable device, a network-side device in a future 5G network or a network after 5G, or a network device in a future evolved PLMN network.

The network device in embodiments of this application may also be referred to as a radio access network (RAN) device. The RAN device is connected to a terminal device, and is configured to receive data from the terminal device and send the data to a core network device. The RAN device corresponds to different devices in different communication systems, for example, in a 2G system, corresponds to a base station and a base station controller, in a 3G system, corresponds to a base station and a radio network controller (RNC), in a 4G system, corresponds to an evolved NodeB (Evolutional NodeB, eNB), and in a 5G system, corresponds to an access network device (for example, a gNB, a CU, or a DU) in the 5G system, for example, a new radio access technology (NR) system.

In the embodiments of this application, "at least one" means one or more, and "a plurality of" means two or more. The term "and/or" describes an association relationship between associated objects and represents that three relationships may exist. For example, A and/or B may represent the following three cases: Only A exists, both A and B exist, and only B exists. A and B may be singular or plural. The character "/" usually indicates an "or" relationship between the associated objects. "At least one (piece) of the following" or a similar expression thereof means any combination of these items, including any combination of singular items (pieces) or plural of items (pieces). For example, at least one item (piece) of a, b, or c may indicate: a, b, c, a and b, a and c, b and c, or a, b, and c, where a, b, and c may be singular or plural.

In addition, unless otherwise stated, ordinal numbers such as "first" and "second" in the embodiments of this application are used to distinguish between a plurality of objects, and are not intended to limit a sequence, a time sequence, priorities, or importance of the plurality of objects. For example, first information and second information are merely intended to distinguish between different messages, but do not indicate that the two types of information are different in content, a priority, a sending sequence, importance, or the like.

For ease of understanding this application, some elements introduced in the description of this application are first described herein.

A transmission location of an information block is a bit of the information block in DCI, a slot in which the information block is located, or the like, and should not be understood as a specific location. A bit may be a start bit, an end bit, or the like of the information block in the DCI. Another location in the embodiments of this application may also be understood as a bit, a slot, or the like.

A length of the information block should be understood as a bit length of the information block, and indicates a quantity of bits occupied by the information block.

The embodiments of this application relate to the following acronyms or abbreviations: DCI: downlink control information; DRX: discontinuous reception; PDCCH: physical downlink control channel; RRC: radio resource control; ID: identity document; and PDSCH: physical downlink shared channel.

The foregoing describes some concepts in the embodiments of this application. The following describes technical features in the embodiments of this application.

FIG. 1 is a schematic diagram of an architecture of a communication system according to an embodiment of this application. As shown in FIG. 1, the communication system includes a network device 101 and b terminal devices 102. Herein, b=3 is used as an example for description. The network device 101 determines DCI. The DCI includes indication information and m information blocks, the indication information is used to indicate the b terminal devices, and the indication information may indicate energy-saving states of the b terminal devices, where m≤b. A first information block in the m information blocks corresponds to a first terminal device in the b terminal devices 102, and the first information block is used to indicate energy-saving information of the first terminal device. A second information block in the m information blocks corresponds to a second terminal device in the b terminal devices, the second information block is used to indicate energy-saving information of the second terminal device, and a length of the first information block is different from a length of the second information block. The network device 101 sends the DCI, and the terminal device 102 receives the DCI, and monitors a physical downlink control channel (PDCCH) based on the corresponding first information block in the DCI. The m information blocks should not be understood to be information blocks that only includes an information block with the same length as the first information block and/or an information block with the same length as the second information block. In other words, the m information blocks may be longer than the first information block and the second information block and may include the first information block and the second information block. The m information blocks may further include information blocks of a plurality of lengths, and each length may correspond to one or more information blocks. The information block is used to indicate energy-saving information of the terminal device. The terminal device obtains a corresponding information block from the DCI, and monitors the PDCCH based on the energy-saving information indicated by the information block, so that behavior of monitoring the PDCCH by the terminal device better matches upcoming data transmission (for example, the terminal device switches to a bandwidth part (BWP) with an appropriate bandwidth based on the energy-saving information indicated by the information block, and sends and receives data by using an appropriate PDCCH monitoring period, an appropriate maximum quantity of multiple-input and multiple-output (MIMO) layers, an appropriate minimum delay K0/K2 value, and the like). This can reduce power consumption of the terminal device.

Figure 2:
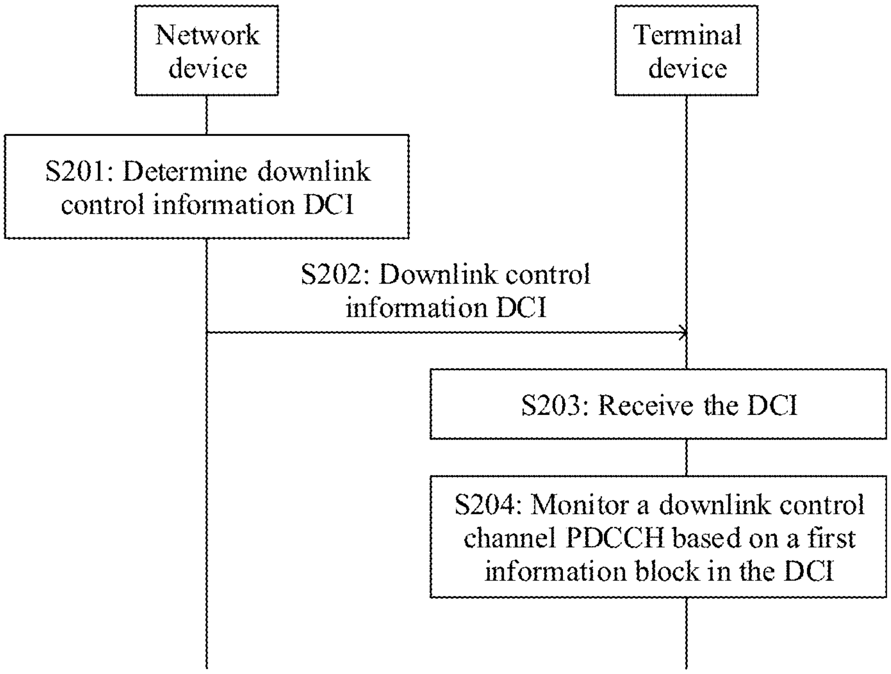
FIG. 2 is a schematic diagram of interaction between a downlink control information (DCI) sending method and a DCI receiving method according to an embodiment of this application.

FIG. 2 is a schematic diagram of interaction between a DCI sending method and a DCI receiving method according to an embodiment of this application. As shown in FIG. 2, the DCI sending method and the DCI receiving method include step S201 to step S204. Exemplary steps are as follows:

S201: A network device determines downlink control information (DCI).

The DCI includes indication information and m information blocks. The indication information is used to indicate energy-saving states of b terminal devices. The b terminal devices support a DRX mechanism. The energy-saving state may be understood as whether the terminal device enters a sleep state or a wake-up state of the DRX mechanism. Entering the sleep state may be understood as entering the energy-saving state, to reduce power consumption. Entering the wake-up state may be understood as entering a working state, and the power consumption increases relative to the sleep state. In the sleep state of the DRX mechanism, the terminal device may completely disable communication components such as a radio frequency transceiver and a baseband processor, to reduce power consumption of the terminal device. In the wake-up state of the DRX mechanism, the terminal device monitors a PDCCH.

A first information block in the m information blocks corresponds to a first terminal device in the b terminal devices, and the first information block is used to indicate energy-saving information of the first terminal device. A second information block in the m information blocks corresponds to a second terminal device in the b terminal devices, and the second information block is used to indicate energy-saving information of the second terminal device. A length of the first information block is different from a length of the second information block, and m≤b.

Optionally, the energy-saving information indicated by the information block includes at least one of the following: a wake-up signal (WUS) indication, a bandwidth part (BWP) indication, a maximum MIMO layer, cross-slot scheduling (for example, a minimum delay K0/K2 value), AP channel state information reference signal (AP-CSI-RS) triggering, aperiodic tracking reference signal (TRS) triggering, aperiodic sounding reference signal (SRS) triggering, information (for example, a cell number or a cell group number) about a cell that monitors a PDCCH after being woken up, and the like.

S202: The network device sends the DCI.

The network device sends the DCI on a downlink control channel.

Optionally, the physical downlink control channel PDCCH carrying the DCI is before on duration of one DRX period. The physical downlink control channel PDCCH carrying the DCI shifts by a offsets before the on duration of the DRX period, where a is a number greater than or equal to 0.

S203: The terminal device receives the DCI.

The terminal device is one of the b terminal devices, and the terminal device corresponds to the first information block in the m information blocks. It is noted that the terminal device may alternatively correspond to another information block, for example, the second information block in the m information blocks.

S204: The terminal device monitors the physical downlink control channel (PDCCH) based on the first information block in the DCI.

The terminal device monitors the PDCCH based on the energy-saving information indicated by the first information block.

After receiving the DCI, the terminal device obtains the energy-saving information indicated by the first information block corresponding to the terminal device. The terminal device may obtain, from the DCI, the energy-saving information indicated by the first information block. If the terminal device cannot obtain the first information block from the DCI, the terminal device may obtain, from configuration information, the energy-saving information indicated by the first information block. The configuration information is preconfigured by the network device for the terminal device, and includes the energy-saving information indicated by the information block corresponding to the terminal device.

In a possible implementation, before sending the DCI, the network device sends a configuration message, where the configuration message carries at least one of the length information of a bitmap and the location information of the bitmap in the DCI. The terminal device receives the configuration message before receiving the DCI.

Optionally, the network device may send the configuration message that is carried in RRC signaling or physical layer signaling. After receiving the configuration message, the terminal device stores at least one of the length information of the bitmap and the location information of the bitmap in the DCI that are in the configuration message.

After receiving the DCI, the terminal device may obtain the bitmap based on the length information of the bitmap and the location information of the bitmap in the DCI.

In a possible implementation, the indication information indicates a transmission location of the first information block and/or a transmission location of the second information block by using the bitmap.

Optionally, the indication information may indicate the transmission location of the information block corresponding to the terminal device. The transmission location of the information block corresponding to the terminal device is indicated using a location of the terminal device in the bitmap and a state of the bitmap. The location of the terminal device in the bitmap is configured by the network device for the terminal device by using the configuration information. The configuration information may be carried in the configuration message, or may be carried in another message. The state of the bitmap may be a state sequence, namely, an assignment state of the indication information, of bits 0 and 1 carried in a bit corresponding to the bitmap in the DCI, and the assignment state may include a state in which an assignment value is 0 or 1. The state of the bitmap may be indicated by the assignment value, in the bit of the bitmap, of the indication information. For example, the assignment value of the indication information is 0 or 1, where 0 indicates that the terminal device does not need to monitor the PDCCH in a subsequent time period (without loss of generality, a state of UE in the time period is referred to as a sleep state in this application), and 1 indicates that the terminal device needs to monitor the PDCCH in a subsequent time period based on the corresponding information block. It is clear that value assignment may alternatively be another manner. The value assignment function is used to distinguish states of the bitmap. This is merely an example for description herein, and is not specifically limited. As an example, the subsequent time period is a predefined or preconfigured time period after the DCI is received. For example, the bitmap in the DCI is used to indicate whether a plurality of terminal devices need to monitor the PDCCH in subsequent C-DRX on duration.

Figure 3A:
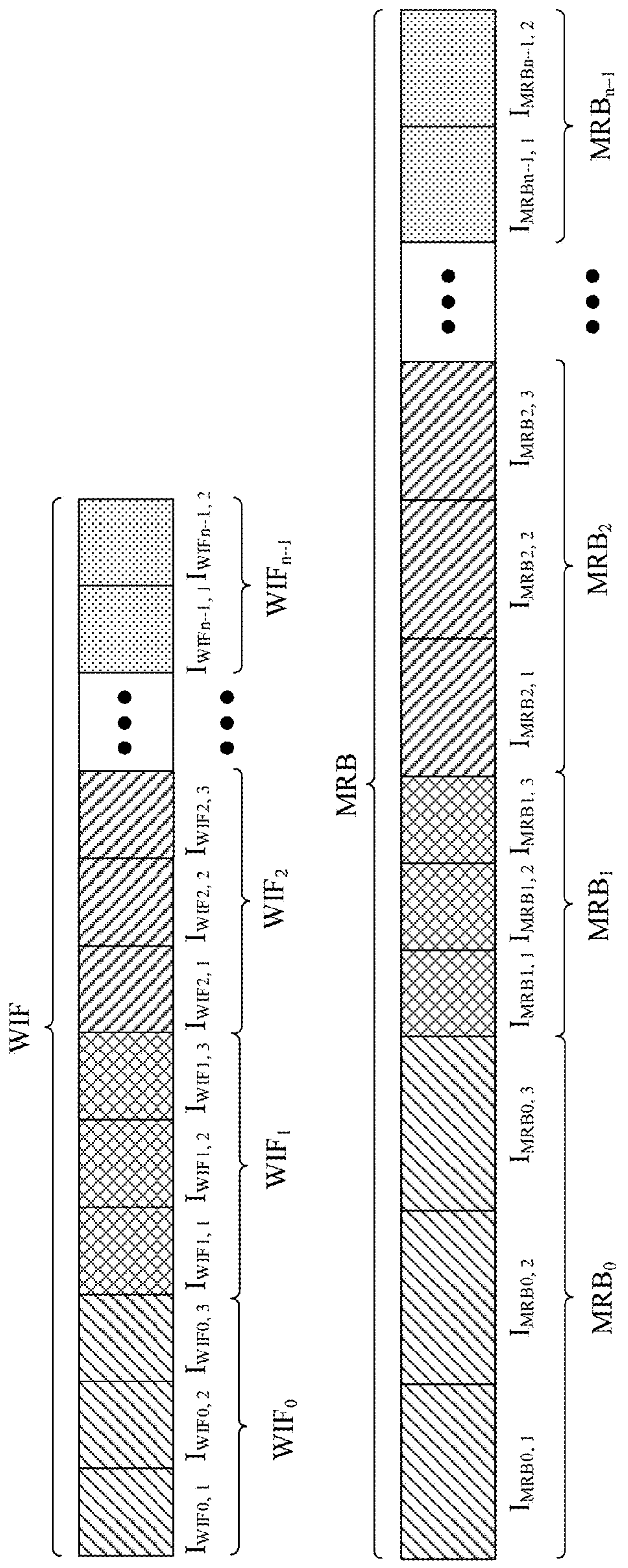
FIG. 3*a* is a schematic diagram of a DCI format according to an embodiment of this application.

FIG. 3*a* is a schematic diagram of a DCI format according to an embodiment of this application. As shown in FIG. 3*a*, a DCI includes a bitmap field (BM field) and an information block field (IB field). As an example, the BM field may be used to indicate whether at least one terminal device (which may be m terminals based on network configuration) is woken up in a subsequent time period. In this case, the bitmap field may also be referred to as a Wake-up signal Indicator Field (WIF field). The information block field may be used to indicate b terminal devices that need to be woken up to determine, based on an information block corresponding to the terminal device, a parameter used to send and receive data after the terminal device is woken up, for example, how to receive a PDCCH and a PDSCH based on a parameter. Herein, each information block field is denoted as a monitoring and reception block (namely, an MRB field). For example, the information block corresponding to the terminal device may include ID information of a BWP of monitoring the PDCCH and receiving the PDSCH after the terminal device is woken up, a minimum delay K0 value of the PDCCH to schedule the PDSCH, and the like.

A piece of DCI may also include a plurality of BM fields, or a BM field includes a plurality of sub-BM fields, and each BM field or sub-BM field corresponds to a different information block length.

For example, the WIF field includes n sub-WIF fields, namely, a $WIF_0$, a $WIF_1$, a $WIF_2$ to a $WIF_{n-1}$, and the MRB field includes n sub-MRB fields, namely, an $MRB_0$, an $MRB_1$, an $MRB_2$ to an $MRB_{n-1}$, where n is a positive integer. A quantity of indication information in the $WIF_0$ is $W_0$, a quantity of indication information in the $WIF_1$ is $W_1$, and a quantity of indication information in the $WIF_{n-1}$ is $W_{n-1}$. A method for identifying a location of indication information in a WIF is as follows:

Identifiers of the locations of the indication information in the $WIF_0$ are $IWIF_{0,\ 1}$, $IWIF_{0,\ 2}$, . . . , and $I_{WIF0,\ W0}$, identifiers of the locations of the indication information in the $WIF_1$ are $I_{WIF1,\ 1}$, $I_{WIF1,\ 2}$, . . . , and $I_{WIF1,\ W1}$, identifiers of the locations of indication information in the $WIF_2$ are $I_{WIF2,\ 1}$, $I_{WIF2,\ 2}$, . . . , and $I_{WIF2,\ W2}$, . . . , and identifiers of the locations of the indication information in the $WIF_{n-1}$ are $I_{WIFn-1,\ 1}$, $I_{WIFn-1,\ 2}$, . . . , and $I_{WIFn-1,\ Wn-1}$. As an example, a manner of identifying a location of indication information may be sequentially numbering, or numbering from left to right (in a descending order). This is not limited in this application. For example, the identifier of the location of the first indication information from the left in the $WIF_0$ is $I_{WIF0,\ 1}$.

The location of the indication information in the WIF corresponds to at least one terminal device. Typically, the location of the indication information in the WIF is in a one-to-one correspondence with one terminal device. For example, in some embodiments of this application, the location of the indication information in the WIF corresponds to at least one terminal device in the b terminal devices. Typically, locations of indication information in the WIF are in a one-to-one correspondence with the b terminal devices. When the terminal device corresponding to the location of the indication information is subsequently described, an identifier of the location of the indication information is used in the description. For example, if the terminal device corresponds to the identifier of the location $I_{WIF1,\,2}$, an identifier of the terminal device is also denoted as $I_{WIF1,\,2}$. In this manner, the terminal device corresponding to the location of each piece of indication information is identified. Locations of information blocks in the MRB are identified as $I_{MRB0,\,1}$ and the like. A method for identifying a location of an information block in an MRB is the same as the method for identifying the location of the indication information in the WIF. Details are not described herein again.

Optionally, the location of the indication information in the $WIF_0$ is in a one-to-one correspondence with the location of the information block in the $MRB_0$. A correspondence manner may be from left to right (in a descending order), for example, $IWIF_{0,\,1}$ corresponds to $I_{MRB0,\,1}$, and $I_{WIF0,\,2}$ corresponds to $I_{MRB0,\,2}$. Each information block in the $MRB_0$ has a same bit length, and is denoted as $Z_0$ bits. Each information block in the $MRB_1$ has a same bit length, and is denoted as $Z_1$ bits. Each information block in the $MRB_2$ has a same bit length, and is denoted as $Z_2$ bits, . . . , and each information block in the $MRB_{n-1}$ has a same bit length, and is denoted as Zn-1 bits. In the information blocks corresponding to the $MRB_0$, the $MRB_1$, and the $MRB_2$ to the $MRB_{n-1}$, bit lengths of at least two information blocks are different, that is, at least two values of $Z_0$ to $Z_{n-1}$ are different.

An example in which an assignment value is 0 or 1 is used for description herein. In the foregoing DCI format, if an assignment value of a bit in the bitmap is 0, the energy-saving information indicated by the corresponding information block is empty, and the terminal device maintains a sleep state until next on duration of a DRX mechanism arrives. If an assignment value of a bit in the bitmap is 1, the energy-saving information indicated by the corresponding information block is at least one of the following: a WUS indication, a BWP indication, a maximum MIMO layer, cross-slot scheduling, and AP-CSI-RS triggering, and the terminal device monitors the PDCCH based on the energy-saving information indicated by the information block corresponding to the terminal device until next on duration of a DRX mechanism arrives. The energy-saving information indicated by the corresponding information block may alternatively be another type of information in the energy-saving information in the foregoing embodiment. This is merely an example for description herein, and details are not described herein again.

Figure 3B:
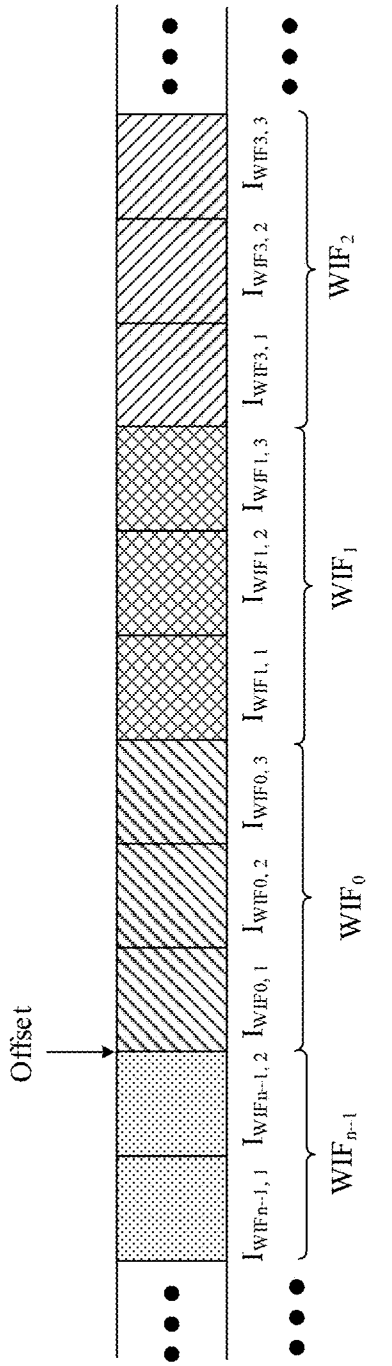
FIG. 3*b* is a schematic diagram of a WIF according to an embodiment of this application.

A WIF filling manner in the foregoing embodiment is sequentially filling (from left to right or in descending order) by using $I_{WIF0,\,1}$ as a start field of the WIF field. Alternatively, optionally, as shown in FIG. 3*b*, another possible WIF filling manner may be setting $I_{WIF0,\,1}$ in a pseudo-random manner, that is, randomly selecting a field from the WIF as $I_{WIF0,\,1}$ by using obtained random numbers (offset), and then filling the WIF in a cyclic filling manner. For example, the cyclic filling manner is as follows: shifting a start location of the WIF to the right by the offset, using a location obtained through shifting as $I_{WIF0,\,1}$, filling the WIF in a sequence from the $WIF_0$ to the $WIF_{n-1}$ by using the location as a start location, and filling remaining unfilled indication information from the start field of the WIF after the last field of the WIF is filled. For a specific filling manner, refer to a method shown in FIG. 3*b*.

The foregoing DCI format is used in the following example. When determining a transmission location of the corresponding information block, the terminal device may directly obtain, based on a mapping relationship between the WIF and the MRB, the transmission location of the information block corresponding to the terminal device, to obtain the energy-saving information in the information block from the transmission location.

The foregoing DCI format may maintain a complete information block field, and an information block in the information block field carries energy-saving information. The lengths of at least two information blocks in the information block are different, so that information blocks with different lengths may be determined for different terminal devices. A length of an information block is a length of energy-saving information indicated by the information block, the length of the information block may match a terminal device, and an information block with an appropriate length may be configured for a particular terminal device (for example, for different terminal devices, indicated energy-saving information is different). In comparison with the existing solution in which energy-saving information is indicated by using an information block with a fixed length, DCI overheads can be reduced by using a variable-length DCI format.

Figure 4:
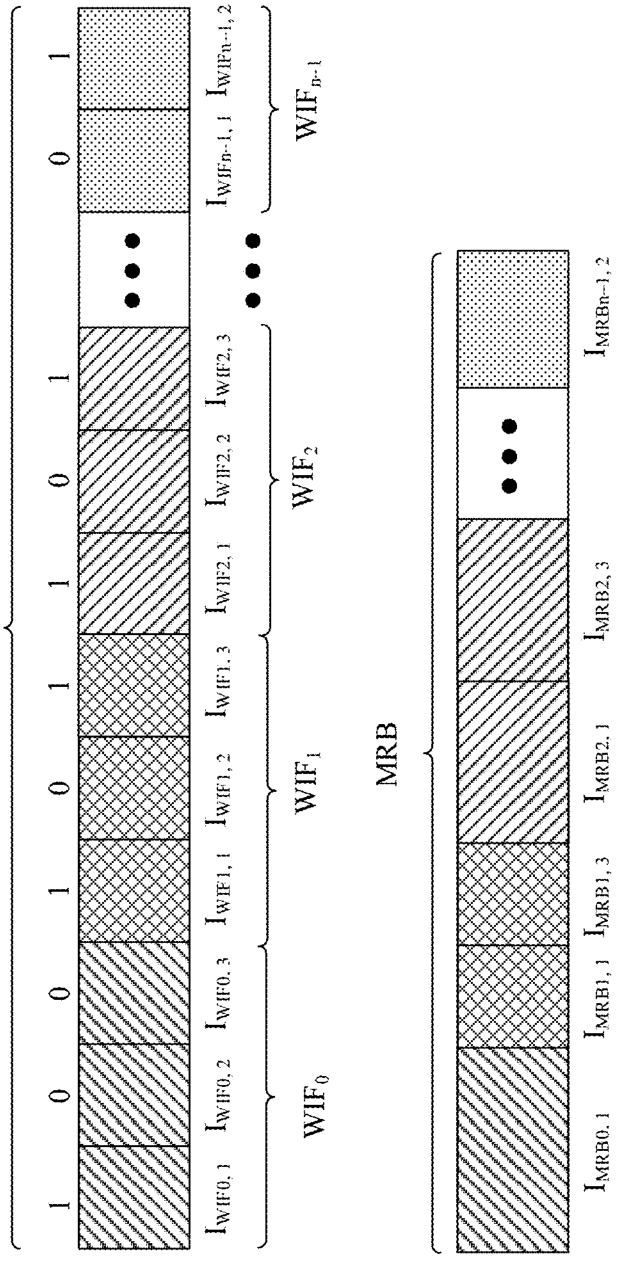
FIG. 4 is a schematic diagram of another DCI format according to an embodiment of this application.

In a possible implementation, FIG. 4 is a schematic diagram of another DCI format according to an embodiment of this application. As shown in FIG. 4, an example in which an assignment value of indication information in a bit of a bitmap is 0 or 1 is used for description. A DCI carries an information block corresponding to a terminal device corresponding to a location in which the assignment value of the indication information in the bitmap is 1. For example, an assignment value of $I_{WIF0,\,1}$ is 1, the DCI carries an information block corresponding to a terminal device corresponding to $I_{WIF0,\,1}$, a method for filling energy-saving information in an information block in an MRB field is sequentially filling (from left to right or in descending order), for example, from $I_{WIF0,\,1}$ to $I_{WIF1,\,1}$, and the information block corresponding to the terminal device corresponding to $I_{WIF0,\,1}$ is before an information block corresponding to a terminal device corresponding to $I_{WIF1,\,1}$.

Optionally, the indication information may indicate, based on a location of the terminal device in the bitmap and a state of the bitmap, a transmission location of the information block by using the following formula, where an example in which the transmission location is a start bit of the information block is used for description.

$$P=\sum_{i=0}^{N-1} L_i+\sum_{i=0}^{X-1} W_i Z_i+Z_{WIF_X} * I_X,$$

where

P is the transmission location, $L_i$ is a byte length of a $WIF_i$, $W_i$ is a quantity of indication information in the $WIF_i$, $Z_i$ is a bit length or a byte length of an information block in an $MRB_i$, X is a number of a WIF in which the terminal device is located, $I_x$ is a location of indication information corresponding to the terminal device in the $WIF_X$, $Z_{WIF_X}$ is a bit length or a byte length of an $MRB_X$ corresponding to the $WIF_X$, i and N are positive integers, and mod is a modulo operation.

When an offset exists, the formula is as follows:

$$P = \sum_{i=0}^{N-1} L_i + \sum_{i=0}^{(X-offset-1)modN} W_{(offset+i)modN} Z_{(offset+i)modN} + Z_{WIF_X} * I_X,$$

where

P is the indicated location, $L_i$ is a byte length of a $WIF_i$, $W_{(offset+i)mod\ N}$ is a quantity of indication information in the $WIF_i$, $Z_{(offset+i)mod\ N}$ is a bit length or a byte length of an information block in an $MRB_i$, X is a number of a WIF in which the terminal device is located, $I_x$ is a location of indication information corresponding to the terminal device in the $WIF_X$, and $Z_{WIF_X}$ is a bit length or a byte length of the $MRB_i$ corresponding to the $WIF_X$. The offset is a randomly generated start location, and Nis a quantity of WIFs, that is, N is a quantity of WIF fields corresponding to a quantity of UE types with information blocks with different lengths.

In a possible implementation, the DCI carries a compressed field, and the compressed field indicates the bitmap. After receiving the DCI, the terminal device may obtain the bitmap based on the compressed field. After obtaining the bitmap, the terminal device obtains the information block corresponding to the terminal device based on the location of the terminal device in the bitmap and the state of the bitmap.

Optionally, a possible method for obtaining the bitmap based on the compressed field may be as follows: for example, if a base station determines that some terminal devices cannot be woken up at the same time, or there is a very low probability that more than X terminal devices in one cell are woken up at the same time, for example, the probability is less than 1%, the base station may encode, in the compressed field, a combination of terminal devices that may be woken up, or encode, in the compressed field, a state in which UEs are woken up at the same time, where a quantity of UEs is less than or equal to X, and use a special field in the compressed field as a special indication for waking up all terminal devices. In this manner, fewer bits of the compressed field may be used to indicate the combination of terminal devices that need to be woken up.

The base station configures or indicates the corresponding state in the compressed field for/to the terminal device, and the terminal device may obtain, based on the received compressed field, the corresponding combination of terminal devices to be woken up, where the combination corresponds to a unique bitmap. The terminal device may further determine the location of the information block by using the corresponding bitmap.

The foregoing describes a DCI sending method and a DCI receiving method provided in the embodiments of this application. The following describes a communication apparatus provided in the embodiments of this application.

Figure 5:
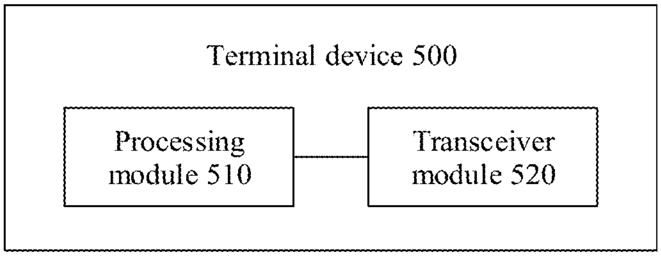
FIG. 5 is a schematic block diagram of a communication apparatus according to an embodiment of this application.

FIG. 5 is a schematic block diagram of a communication apparatus 500 according to an embodiment of this application. The communication apparatus 500 includes a processing module 510 and a transceiver module 520.

The processing module 510 is configured to determine DCI, where the DCI includes indication information and m information blocks, the indication information is used to indicate b terminal devices, a first information block in the m information blocks corresponds to a first terminal device in the b terminal devices, the first information block is used to indicate energy-saving information of the first terminal device, a second information block in the m information blocks corresponds to a second terminal device in the b terminal devices, the second information block is used to indicate energy-saving information of the second terminal device, a length of the first information block is different from a length of the second information block, and m≤b.

The transceiver module 520 is configured to send the DCI.

In an embodiment of this application, the length of the first information block corresponding to the first terminal device is different from the length of the second information block corresponding to the second terminal device, so that information blocks with different lengths can be arranged for different terminal devices. This improves adaptability of information blocks in the DCI. In addition, a network device may determine information blocks corresponding to m terminal devices in the b terminal devices. The information block is used to indicate energy-saving information of the terminal device, the DCI may indicate to the terminal device in the m terminal devices to obtain the corresponding information block from the DCI, and monitor a PDCCH based on the energy-saving information indicated by the information block, and a blind detection operation does not need to be performed. This can reduce power consumption of the terminal devices.

Optionally, in an implementation, the indication information indicates a transmission location of the first information block and/or a transmission location of the second information block by using a bitmap.

Optionally, the indication information indicates the transmission location of the first information block by using a location of the first terminal device in the bitmap and a state of the bitmap and/or indicates the transmission location of the second information block by using a location of the second terminal device in the bitmap and a state of the bitmap.

Optionally, in an implementation, the indication information is used to indicate a transmission location of each of the m information blocks.

Optionally, in an implementation, before sending the DCI, the transceiver module 510 is further configured to send a configuration message, where the configuration message carries at least one of the length information of the bitmap and the location information of the bitmap in the DCI.

Optionally, the configuration message is carried in RRC signaling or physical layer signaling.

Optionally, in an implementation, a mapping relationship between a transmission location and a location of a terminal device in the bitmap is as follows:

$$P = \sum_{i=0}^{N-1} L_i + \sum_{i=0}^{X-1} W_i Z_i + Z_{WIF_X} * I_X,$$

where

P is the transmission location, $L_i$ is a bit length of a $WIF_i$, $W_i$ is a quantity of indication information in the $WIF_i$, $Z_i$ is a bit length of an information block in an $MRB_i$, X is a number of a WIF in which the terminal device is located, $I_x$ is a location of indication information corresponding to the terminal device in the $WIF_X$, $Z_{WIF_X}$ is a bit length of an $MRB_X$ corresponding to the $WIF_X$, the $WIF_i$ is an $i^{th}$ bitmap field, an $MRB_i$ is an $i^{th}$ information block field in the DCI, a location of the indication information is the location of the terminal device in the bitmap, and i and N are positive integers.

Optionally, in an implementation, a mapping relationship between a transmission location and a location of a terminal device in the bitmap is as follows:

$$P=\sum_{i=0}^{N-1}L_i+\sum_{i=0}^{(X-offset-1)modN}W_{(offset+i)modN}Z_{(offset+i)modN}+Z_{WIF_X}*I_X,$$

where

P is the transmission location, $L_i$ is a bit length of a $WIF_i$, $W_{(offset+i)mod\ N}$ is a quantity of indication information in the $WIF_i$, $Z_{(offset+i)mod\ N}$ is a bit length of an information block in an $MRB_i$, X is a number of a WIF in which the terminal device is located, $I_x$ is a location of indication information corresponding to the terminal device in the $WIF_X$, $Z_{WIF_X}$ is a bit length of an $MRB_X$ corresponding to the $WIF_X$, the $WIF_i$ is an $i^{th}$ bitmap field, an $MRB_i$ is an $i^{th}$ information block field in the DCI, a location of the indication information is the location of the terminal device in the bitmap, an offset is a start location that is randomly generated, N is a quantity of WIFs, and i and N are positive integers.

Figure 6:
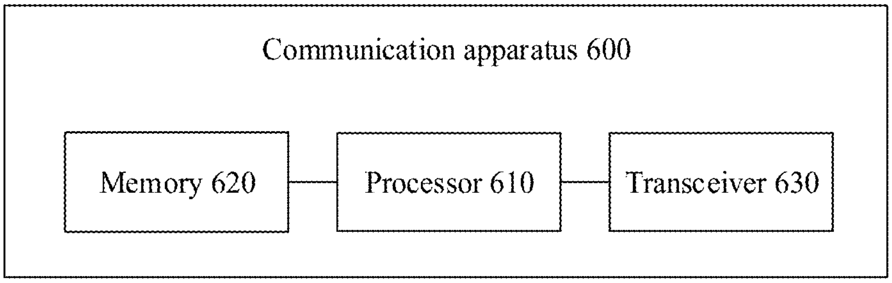
FIG. 6 is a schematic block diagram of another communication apparatus according to an embodiment of this application.

As shown in FIG. 6, an embodiment of this application further provides a communication apparatus 600. The communication apparatus 600 includes a processor 610, a memory 620, and a transceiver 630. The memory 620 stores instructions or a program, and the processor 610 is configured to execute the instructions or the program stored in the memory 620. When the instructions or the program stored in the memory 620 are/is executed, the processor 610 is configured to perform an operation performed by the processing module 510 in the foregoing embodiment, and the transceiver 630 is configured to perform an operation performed by the transceiver module 520 in the foregoing embodiment.

It should be understood that the communication apparatus 500 or the communication apparatus 600 in the embodiments of this application may correspond to the terminal device in the DCI sending method and the DCI receiving method in the embodiments of this application, and operations and/or functions of modules in the communication apparatus 500 or the communication apparatus 600 are separately used to implement corresponding procedures in the methods in FIG. 2 to FIG. 4. For brevity, details are not described herein again.

Figure 7:
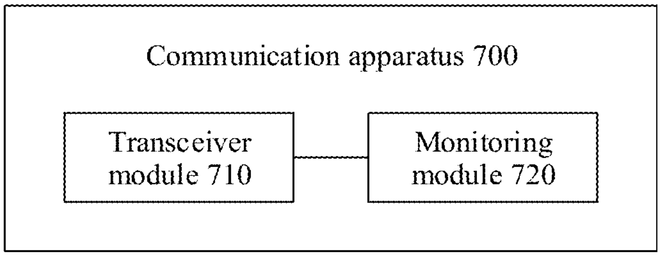
FIG. 7 is a schematic block diagram of another communication apparatus according to an embodiment of this application.

FIG. 7 is a schematic block diagram of a communication apparatus 700 according to an embodiment of this application. The communication apparatus 700 includes a transceiver module 710 and a monitoring module 720.

The transceiver module 710 is configured to receive DCI, where the DCI includes indication information and m information blocks, the indication information is used to indicate b terminal devices, a first terminal device is one of the b terminal devices, a first information block in the m information blocks corresponds to the first terminal device, the first information block is used to indicate energy-saving information of the first terminal device, the lengths of at least two information blocks in the m information blocks are different, and m≤b.

The monitoring module 720 is configured to monitor a downlink control channel PDCCH based on the first information block.

In this embodiment of this application, the transceiver module 710 receives the DCI, and the DCI includes m information blocks, the lengths of at least two information blocks in the m information blocks are different, and the lengths of information blocks corresponding to at least two terminal devices are different. This can improve adaptability of the DCI during setup (e.g., during configuration, during system setup). The terminal device monitors the PDCCH based on the energy-saving information indicated by the corresponding first information block in the m information blocks, and a blind detection operation does not need to be performed. This can reduce power consumption of the terminal device.

Optionally, in an implementation, the indication information indicates a transmission location of the first information block by using a bitmap.

Optionally, the indication information indicates the transmission location of the first information block by using a location of the terminal device in the bitmap and a state of the bitmap.

Optionally, in an implementation, the indication information is used to indicate a transmission location of each of the m information blocks.

Optionally, in an implementation, before receiving the DCI, the transceiver module 710 is further configured to receive a configuration message, where the configuration message carries at least one of the length information of the bitmap and the location information of the bitmap in the DCI.

Optionally, the configuration message is carried in RRC signaling or physical layer signaling.

Optionally, in an implementation, a mapping relationship between a transmission location and a location of a terminal device in the bitmap is as follows:

$$P=\sum_{i=0}^{N-1}L_i+\sum_{i=0}^{X-1}W_iZ_i+Z_{WIF_X}*I_X,$$

where

P is the transmission location, $L_i$ is a bit length of a $WIF_i$, $W_i$ is a quantity of indication information in the $WIF_i$, $Z_i$ is a bit length of an information block in an $MRB_i$, X is a number of a WIF in which the terminal device is located, $I_x$ is a location of indication information corresponding to the terminal device in the $WIF_X$, $Z_{WIF_X}$ is a bit length of an $MRB_X$ corresponding to the $WIF_X$, the $WIF_i$ is an $i^{th}$ bitmap field, an $MRB_i$ is an $i^{th}$ information block field in the DCI, a location of the indication information is the location of the terminal device in the bitmap, and i and N are positive integers.

Optionally, in an implementation, a mapping relationship between a transmission location and a location of a terminal device in the bitmap is as follows:

$$P=\sum_{i=0}^{N-1}L_i+\sum_{i=0}^{(X-offset-1)modN}W_{(offset+i)modN}Z_{(offset+i)modN}+Z_{WIF_X}*I_X,$$

where

P is the transmission location, $L_i$ is a bit length of a $WIF_i$, $W_{(offset+i)mod\ N}$ is a quantity of indication information in the $WIF_i$, $Z_{(offset+i)mod\ N}$ is a bit length of an information block in an $MRB_i$, X is a number of a WIF in which the terminal device is located, $I_x$ is a location of indication information corresponding to the terminal device in the $WIF_X$, $Z_{WIF_X}$ is a bit length of an $MRB_X$ corresponding to the $WIF_X$, the $WIF_i$ is an $i^{th}$ bitmap field, an $MRB_i$ is an $i^{th}$ information block field in the DCI, a location of the indication information is the location of the terminal device in the bitmap, an offset is a start location that is randomly generated, N is a quantity of WIFs, and i and N are positive integers.

It should be understood that the monitoring module 720 in this embodiment of this application may be implemented by a processor or a processor-related circuit component, and the transceiver module 710 may be implemented by a transceiver or a transceiver-related circuit component.

Figure 8:
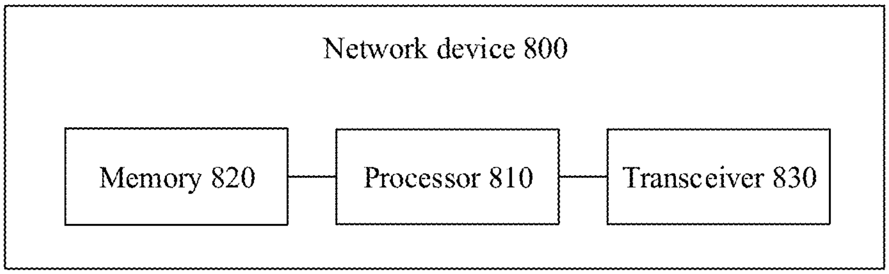
FIG. 8 is a schematic block diagram of a network device according to an embodiment of this application.

As shown in FIG. 8, an embodiment of this application further provides a network device 800. The network device 800 includes a processor 810, a memory 820, and a transceiver 830. The memory 820 stores instructions or a program, and the processor 810 is configured to execute the instructions or the program stored in the memory 820. When the instructions or the program stored in the memory 820 are/is executed, the processor 810 is configured to perform an operation performed by the monitoring module 720 in the foregoing embodiment, and the transceiver 830 is configured to perform an operation performed by the transceiver module 710 in the foregoing embodiment.

It should be understood that the communication apparatus 700 or the network device 800 in the embodiments of this application may correspond to the network device in the DCI sending method and the DCI receiving method in the embodiments of this application, and operations and/or functions of modules in the communication apparatus 700 or the network device 800 are separately used to implement corresponding procedures in the methods in FIG. 2 to FIG. 4. For brevity, details are not described herein again.

An embodiment of this application further provides a computer-readable storage medium. The computer-readable storage medium may be transitory or non-transitory and stores a computer program. When the program is executed by a processor, a procedure related to the communication apparatus in the DCI sending method provided in the foregoing method embodiment may be implemented.

An embodiment of this application further provides a communication apparatus. The communication apparatus may be a terminal device or a circuit. The communication apparatus may be configured to perform a method performed by the terminal device in the foregoing method embodiments.

Figure 9:
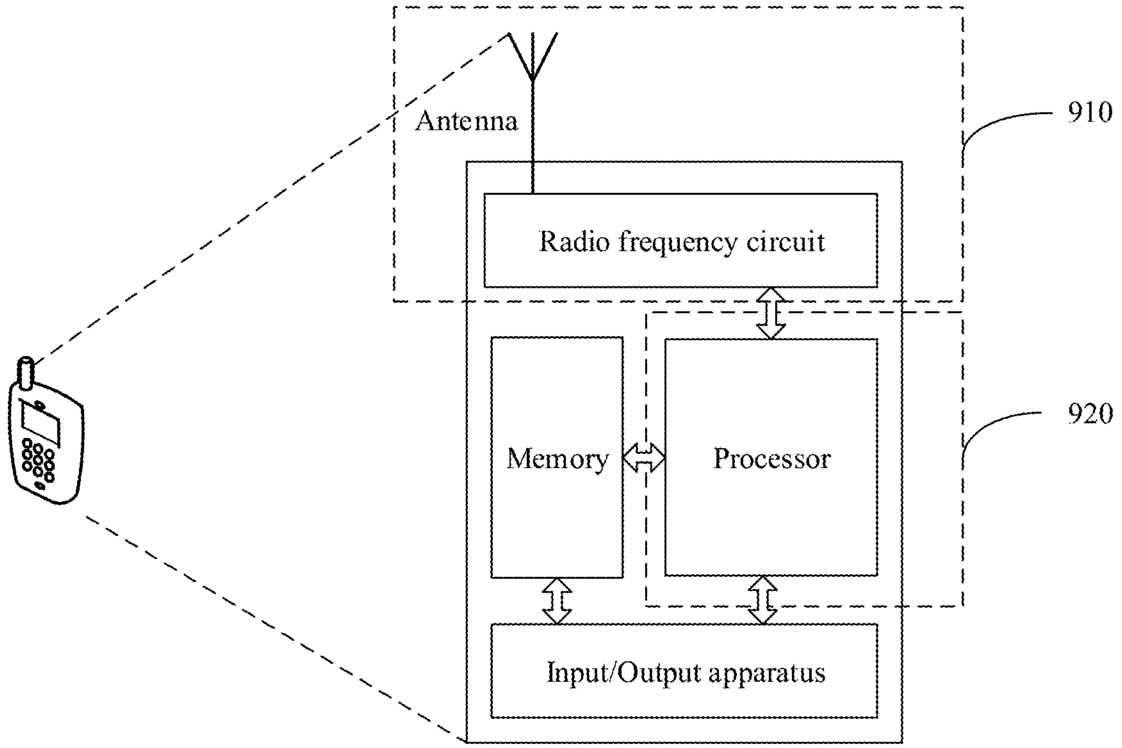
FIG. 9 is a schematic block diagram of another network device according to an embodiment of this application.

When the communication apparatus is a terminal device, FIG. 9 is a simplified schematic diagram of a structure of a terminal device. For ease of understanding and convenience of figure illustration, an example in which the terminal device is a mobile phone is used in FIG. 9. As shown in FIG. 9, the terminal device includes a processor, a memory, a radio frequency circuit, an antenna, and an input/output apparatus. The processor is configured to: process a communication protocol and communication data, control the terminal device, execute a software program, process data of the software program, and the like. The memory is configured to store the software program and the data. The radio frequency circuit is configured to: perform conversion between a baseband signal and a radio frequency signal, and process the radio frequency signal. The antenna is configured to receive and send a radio frequency signal in a form of an electromagnetic wave. The input/output apparatus, such as a touchscreen, a display, or a keyboard, is configured to: receive data input by a user and output data to the user. It should be noted that some types of terminal devices may not have an input/output apparatus.

When needing to send data, after performing baseband processing on the to-be-sent data, the processor outputs a baseband signal to the radio frequency circuit; and the radio frequency circuit performs radio frequency processing on the baseband signal and then sends the radio frequency signal to the outside in a form of an electromagnetic wave through the antenna. When data is sent to the terminal device, the radio frequency circuit receives the radio frequency signal through the antenna, converts the radio frequency signal into a baseband signal, and outputs the baseband signal to the processor. The processor converts the baseband signal into data, and processes the data. For ease of description, FIG. 9 shows only one memory and one processor. In an actual terminal device product, there may be one or more processors and one or more memories. The memory may also be referred to as a storage medium, a storage device, or the like. The memory may be disposed independently of the processor, or may be integrated with the processor. This is not limited in the embodiments of this application.

In some embodiments of this application, the radio frequency circuit and the antenna that has sending and receiving functions may be considered as a transceiver unit of the terminal device, and the processor that has a processing function may be considered as a processing unit of the terminal device. As shown in FIG. 9, the terminal device includes a transceiver unit 910 and a processing unit 920. The transceiver unit may also be referred to as a transceiver, a transceiver machine, a transceiver apparatus, or the like. The processing unit may also be referred to as a processor, a processing board, a processing module, a processing apparatus, or the like. Optionally, a component that is in the transceiver unit 910 and that is configured to implement a receiving function may be considered as a receiving unit, and a component that is in the transceiver unit 910 and that is configured to implement a sending function may be considered as a sending unit. In other words, the transceiver unit 910 includes a receiving unit and a sending unit. The transceiver unit sometimes may also be referred to as a transceiver machine, a transceiver, a transceiver circuit, or the like. The receiving unit may also be sometimes referred to as a receiver, a receiving circuit, or the like. The sending unit may also be sometimes referred to as a transmitter, a transmitter, a transmitting circuit, or the like.

It should be understood that the transceiver unit 910 is configured to perform a sending operation and a receiving operation on a terminal device side in the foregoing method embodiments, and the processing unit 920 is configured to perform an operation other than the sending operation and the receiving operation on the terminal device in the foregoing method embodiments.

For example, in an implementation, the transceiver unit 910 is configured to perform a receiving operation on a terminal device side in step S203 in FIG. 2, and/or the transceiver unit 910 is further configured to perform another receiving and sending step on a terminal device side in the embodiments of this application. The processing unit 920 is configured to perform step S204 in FIG. 2, and/or the processing unit 920 is further configured to perform another processing step on a terminal device side in the embodiments of this application.

When the communication apparatus is a chip apparatus or circuit, the apparatus may include a transceiver unit and a processing unit. The transceiver unit may be an input/output circuit and/or a communication interface. The processing unit is an integrated processor, a microprocessor, or an integrated circuit.

Figure 10:
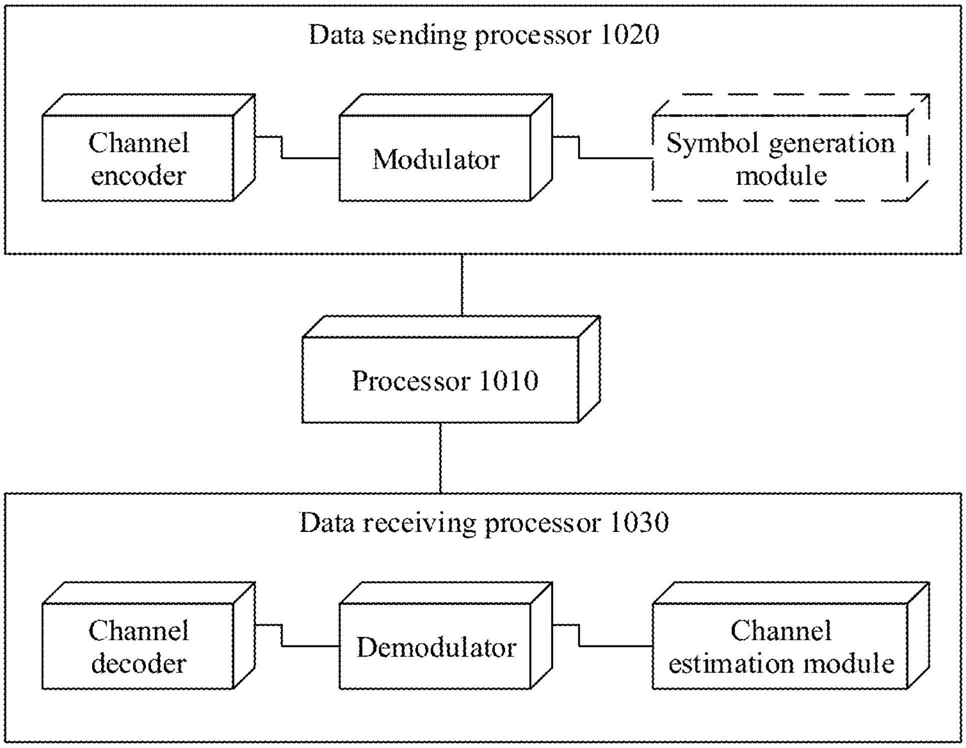
FIG. 10 is a schematic block diagram of another communication apparatus according to an embodiment of this application.

When the communication apparatus in this embodiment is a terminal device, refer to the terminal device shown in FIG. 10. In an example, the device can implement a function similar to that of the processor 610 in FIG. 6. In FIG. 10, the terminal device includes a processor 1010, a data sending processor 1020, and a data receiving processor 1030. The processing module 510 in the foregoing embodiment may be the processor 1010 in FIG. 10, and implements a corresponding function. The transceiver module 710 in the foregoing embodiment may be the data sending processor 1020 and/or the data receiving processor 1030 in FIG. 10. Although FIG. 10 shows a channel encoder and a channel decoder, it may be understood that these modules are merely examples, and do not constitute limitative description of these embodiments.

Figure 11:
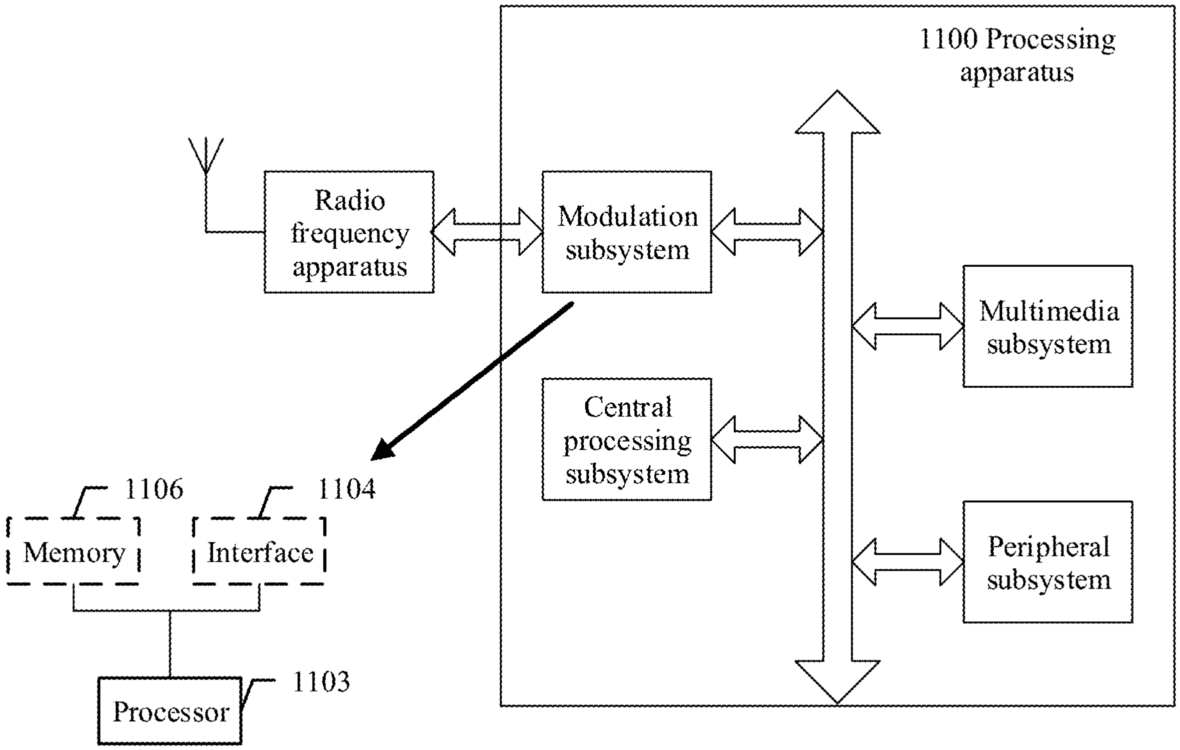
FIG. 11 is a schematic block diagram of a terminal device according to an embodiment of this application.

FIG. 11 shows another form of a terminal device according to an embodiment. A processing apparatus 1100 includes modules such as a modulation subsystem, a central processing subsystem, and a peripheral subsystem. The communication apparatus in this embodiment may be used as the modulation subsystem in the communication apparatus. The modulation subsystem may include a processor 1103 and an interface 1104. The processor 1103 completes a function of the foregoing processing module 510, and the interface 1104 completes a function of the foregoing transceiver module 520. In another variation, the modulation subsystem includes a memory 1106, a processor 1103, and a program that is stored in the memory 1106 and that can be run on the processor. When executing the program, the processor 1103 implements the method on the terminal device side in the foregoing method embodiments. It should be noted that the memory 1106 may be non-volatile or volatile. The memory 1106 may be located in the modulation subsystem, or may be located in the processing apparatus 1100, provided that the memory 1106 can be connected to the processor 1103.

In another form of this embodiment, a computer-readable storage medium is provided, and stores instructions. When the instructions are executed, the method on the terminal device side in the foregoing method embodiment is performed.

In another form of this embodiment, a computer program product including instructions is provided. When the instructions are executed, the method on the terminal device side in the foregoing method embodiment is performed.

Figure 12:
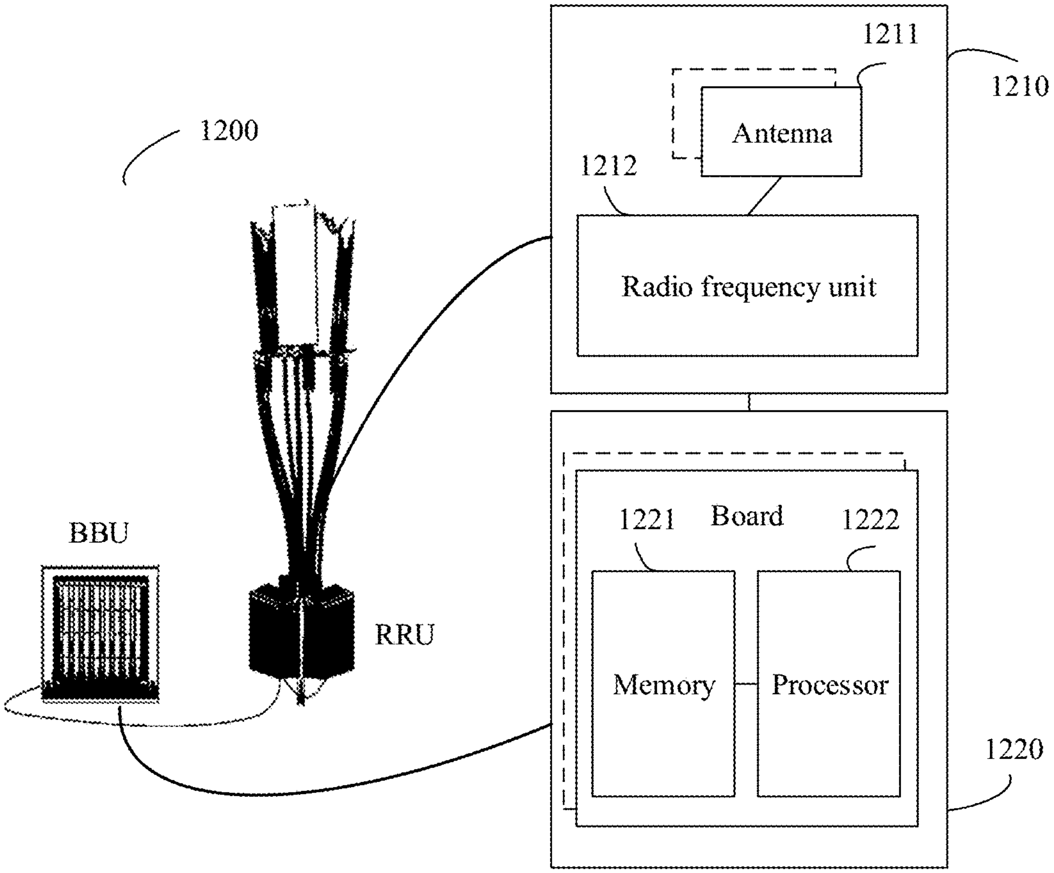
FIG. 12 is a schematic block diagram of a network device according to an embodiment of this application.

When the apparatus in this embodiment is a network device, the network device may be shown in FIG. 12. A network device 1200 includes one or more radio frequency units, such as a remote radio unit (RRU) 1210, and one or more baseband units (BBU) 1220, which are also referred to as a digital unit (DU). The RRU 1210 may be referred to as a transceiver module, and corresponds to the transceiver module 710 in FIG. 7. Optionally, the transceiver module may also be referred to as a transceiver machine, a transceiver circuit, a transceiver, or the like, and may include at least one antenna 1211 and a radio frequency unit 1212. The RRU 1210 is configured to: receive and send a radio frequency signal, and perform conversion between the radio frequency signal and a baseband signal. For example, the RRU 1210 is configured to send indication information to a terminal device. The BBU 1220 is configured to: perform baseband processing, control a base station, and the like. The RRU 1210 and the BBU 1220 may be physically disposed together, or may be physically disposed separately, that is, in a distributed base station.

The BBU 1220 is a control center of the base station, may also be referred to as a processing module, may correspond to the monitoring module 720 in FIG. 7, and is configured to complete baseband processing functions, such as channel encoding, multiplexing, modulation, and spreading. For example, the BBU (the processing module) may be configured to control the base station to perform an operation procedure related to the network device in the foregoing method embodiments, for example, generating the foregoing indication information.

In an example, the BBU 1220 may include one or more boards. A plurality of boards may jointly support a radio access network (for example, an LTE network) of a single access standard, or may separately support radio access networks of different access standards (such as an LTE network, a 5G network, or another network). The BBU 1220 further includes a memory 1221 and a processor 1222. The memory 1221 is configured to store necessary instructions and necessary data. The processor 1222 is configured to control the base station to perform a necessary action, for example, is configured to control the base station to perform an operation procedure related to the network device in the foregoing method embodiments. The memory 1221 and the processor 1222 may disposed within one or more boards. In other words, the memory and the processor may be separately disposed on each board. Alternatively, a plurality of boards may share a same memory and a same processor. In addition, a necessary circuit may further be disposed on each board.

It should be understood that, the processor mentioned in the embodiments of this application may be a central processing unit (CPU), the processor may further be another general-purpose processor, a digital signal processor (DSP), an application-specific integrated circuit (ASIC), a field programmable gate array (FPGA), or another programmable logic device, discrete gate or transistor logic device, discrete hardware component, or the like. The general-purpose processor may be a microprocessor, or the processor may be any conventional processor or the like.

In another form of this embodiment, a computer-readable storage medium is provided. The computer-readable storage medium stores instructions. When the instructions are executed, the method on the network device side in the foregoing method embodiments is performed.

In another form of this embodiment, a computer program product including instructions is provided. When the instructions are executed, the method on the network device side in the foregoing method embodiments is performed.

Figure 13:
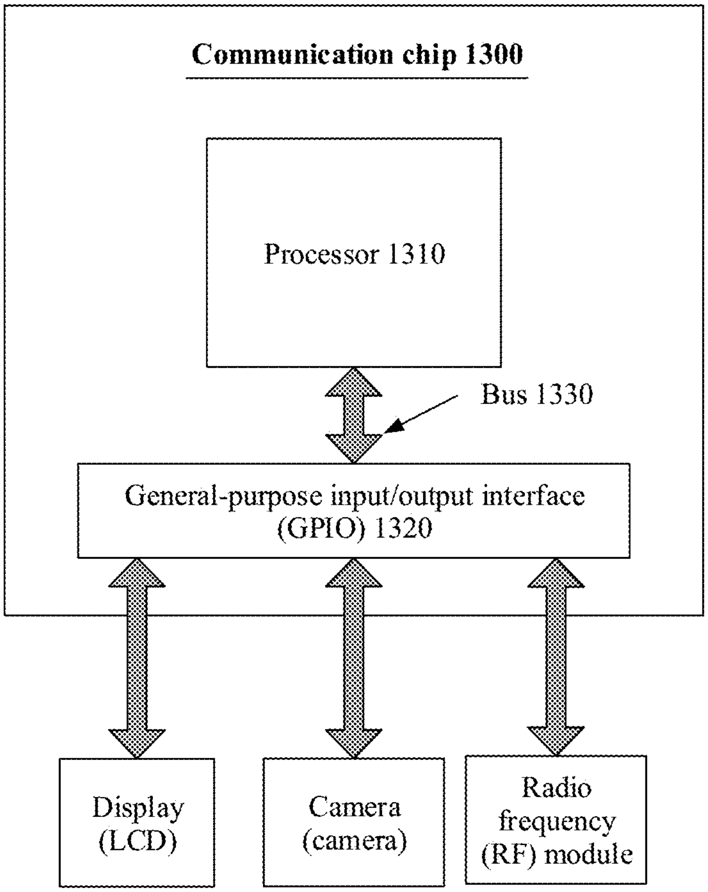
FIG. 13 is a schematic diagram of a structure of a communication chip according to an embodiment of this application.

FIG. 13 is a schematic diagram of a structure of a communication chip according to an embodiment of this application. As shown in FIG. 13, a communication chip 1300 may include a processor 1310 and one or more interfaces 1320 that are coupled to the processor 1310.

For example, the processor 1310 may be configured to read and execute computer-readable instructions. During implementation, the processor 1310 may include a controller, an arithmetic unit, and a register. For example, the controller is responsible for decoding an instruction, and sends a control signal for an operation corresponding to the instruction. The arithmetic unit is responsible for performing a fixed-point or floating-point arithmetic operation, a shift operation, a logic operation, and the like, and may also perform an address operation and address translation. The register is responsible for saving a quantity of register operations, intermediate operation results, and the like that are temporarily stored during instruction execution. During implementation, a hardware architecture of the processor 1310 may be an application-specific integrated circuit (ASIC) architecture, a microprocessor without interlocked piped stages architecture (MIPS) architecture, an advanced reduced instruction set machine (ARM) architecture, an NP architecture, or the like. The processor 1310 may be single-core or may be multi-core.

For example, the interface 1320 may be configured to input to-be-processed data to the processor 1310, and may output a processing result of the processor 1310. During implementation, the interface 1320 may be a general-purpose input/output (GPIO) interface, and may be connected to a plurality of peripheral devices (such as a display, a camera, and a radio frequency (RF) module). The interface 1320 may be connected to the processor 1310 through a bus 1330.

In a possible implementation, the processor 1310 may be configured to invoke, from a memory, a program or data for implementing the DCI sending method and the DCI receiving method on a network device side or a terminal device side provided in one or more embodiments of this application, so that the chip can implement the DCI sending method and the DCI receiving method shown in FIG. 2 to FIG. 4. The memory may be integrated with the processor 1310, or may be coupled to the communication chip 1300 through the interface 1320. In other words, the memory may be a part of the communication chip 1300, or may be independent of the communication chip 1300. The interface 1320 may be configured to output an execution result of the processor 1310. In this application, the interface 1320 may be configured to output a decoding result of the processor 1310. For the DCI sending method and the DCI receiving method provided in one or more embodiments of this application, refer to the foregoing embodiments. Details are not described herein again.

It should be noted that functions corresponding to the processor 1310 and the interface 1320 may be implemented by using hardware design, may be implemented by using software design, or may be implemented by using a combination of software and hardware. This is not limited herein.

It may further be understood that the memory mentioned in the embodiments of this application may be a volatile memory or a nonvolatile memory, or may include both a volatile memory and a nonvolatile memory. The nonvolatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (RAM), used as an external cache. Through example but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM).

It should be noted that when the processor is a general-purpose processor, a DSP, an ASIC, an FPGA or another programmable logic device, a discrete gate, a transistor logic device, or a discrete hardware component, the memory (a storage module) is integrated into the processor.

It should be noted that the memory described in this specification aims to include but is not limited to these memories and any memory of another proper type.

The term "and/or" in this specification describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in another manner. For example, the described apparatus embodiment is merely an example. For example, division into units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

Units described as separate parts may or may not be physically separate, and parts displayed as units may or may not be physical units, may be located in one position, or may be distributed on a plurality of network units. Some or all of the units may be selected based on actual requirements to achieve objectives of the solutions of the embodiments.

In addition, functional units in the embodiments of this application may be integrated into one processing unit, or each of the units may exist alone physically, or two or more units are integrated into one unit.

When the functions are implemented in a form of a software function unit and sold or used as an independent product, the functions may be stored in a computer-readable storage medium. Based on this understanding, the technical solutions of this application essentially, or the part contributing to the prior art, or some of the technical solutions may be implemented in a form of a software product. The computer software product is stored in a storage medium, and includes several instructions for instructing a computer device (which may be, for example, a personal computer, a server, or a network device) to perform all or some of the steps of the methods described in the embodiments of this application. The foregoing storage medium includes various media that can store program code, such as a USB flash drive, a removable hard disk drive, a read-only memory (ROM), a random access memory (RAM), a magnetic disk, and an optical disc.

The foregoing description is merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method, wherein the method comprises:

receiving downlink control information (DCI), wherein the DCI comprises indication information and m information blocks, the indication information is used to indicate b terminal devices, a first terminal device is one of the b terminal devices, a first information block in the m information blocks corresponds to the first terminal device, the first information block is used to indicate energy-saving information of the first terminal device, lengths of at least two information blocks in the m information blocks are different, and m≤b, and wherein the DCI further comprises a compressed field that indicates a bitmap and the bitmap corresponds to a combination of the b terminal devices that are to be woken up at the same time, wherein b is less than or equal to a maximum number of terminal devices in one cell woken up at the same time at a pre-set probability;

obtaining the first information block based on a location of the first terminal device in the bitmap and a state of the bitmap; and monitoring a physical downlink control channel (PDCCH) based on the first information block, wherein the indication information indicates a transmission location of the first information block by using the location of the first terminal device in the bitmap and the state of the bitmap, and a mapping relationship between a transmission location and a location of a terminal device in the bitmap is one of the following:

$$P = \sum_{i=0}^{N-1} L_i + \sum_{i=0}^{X-1} W_i Z_i + Z_{WIF_X} * I_X,$$

wherein P is the transmission location, $L_i$ is a bit length of a wake-up signal indicator field ($WIF_i$), $W_i$ is a quantity of indication information in the $WIF_i$, $Z_i$ is a bit length of an information block in a monitoring and reception block ($MRB_i$), X is a number of a WIF in which the terminal device is located, $I_x$ is a location of indication information corresponding to the terminal device in the $WIF_X$, $Z_{WIF_X}$ is a bit length of an $MRB_X$ corresponding to the $WIF_X$, the $WIF_i$ is an $i^{th}$ bitmap field, an $MRB_i$ is an $i^{th}$ information block field in the DCI, a location of the indication information is the location of the terminal device in the bitmap, and i and N are positive integers, or $$P = \sum_{i=0}^{N-1} L_i + \sum_{i=0}^{(X-offset-1)modN} W_{(offset+i)modN} Z_{(offset+i)modN} + Z_{WIF_X} * I_X,$$

wherein P is the transmission location, $L_i$ is a bit length of a wake-up signal indicator field ($WIF_i$), $W_{(offset+i)mod\ N}$ is a quantity of indication information in the $WIF_i$, $Z_{(offset+i)mod\ N}$ is a bit length of an information block in a monitoring and reception block ($MRB_i$), X is a number of a WIF in which the terminal device is located, $I_x$ is a location of indication information corresponding to the terminal device in the $WIF_X$, $Z_{WIF_X}$ is a bit length of an $MRB_X$ corresponding to the $WIF_X$, the $WIF_i$ is an $i^{th}$ bitmap field, an $MRB_i$ is an $i^{th}$ information block field in the DCI, a location of the indication information is the location of the terminal device in the bitmap, an offset is a start location that is randomly generated, N is a quantity of WIFs, and i and N are positive integers.

2. The method according to claim 1, wherein the indication information is used to indicate a transmission location of each of the m information blocks.

3. The method according to claim 1, wherein before the receiving DCI, the method further comprises:

receiving a configuration message, wherein the configuration message carries at least one of length information of the bitmap or location information of the bitmap in the DCI.

4. The method according to claim 1, wherein the DCI is received from a network device.

5. The method according to claim 1, wherein the b terminal devices support a discontinuous reception mechanism.

6. The method according to claim 1, wherein the energy-saving information comprises at least one of a wake-up signal indication, a bandwidth part indication, or cross-slot scheduling.

7. The method according to claim 1, wherein the DCI is received on a physical downlink control channel.

8. A communication apparatus, comprising a processor; and a computer-readable medium including computer-executable instructions that, when executed by the processor, cause the apparatus to carry out a method including:

receiving downlink control information (DCI), wherein the DCI comprises indication information and m information blocks, the indication information is used to indicate b terminal devices, a first terminal device is one of the b terminal devices, a first information block in the m information blocks corresponds to the first terminal device, the first information block is used to indicate energy-saving information of the first terminal device, lengths of at least two information blocks in the m information blocks are different, and m≤b, and wherein the DCI further comprises a compressed field that indicates a bitmap and the bitmap corresponds to a combination of the b terminal devices that are to be woken up at the same time, wherein b is less than or equal to a maximum number of terminal devices in one cell woken up at the same time at a pre-set probability;

obtaining the first information block based on a location of the first terminal device in the bitmap and a state of the bitmap; and monitoring a physical downlink control channel (PDCCH) based on the first information block, wherein the indication information indicates a transmission location of the first information block by using the location of the first terminal device in the bitmap and the state of the bitmap, and a mapping relationship between a transmission location and a location of a terminal device in the bitmap is one of the following:

$$P = \sum_{i=0}^{N-1} L_i + \sum_{i=0}^{X-1} W_i Z_i + Z_{WIF_X} * I_X,$$

wherein P is the transmission location, $L_i$ is a bit length of a wake-up signal indicator field ($WIF_i$), $W_i$ is a quantity of indication information in the $WIF_i$, $Z_i$ is a bit length of an information block in a monitoring and reception block ($MRB_i$), X is a number of a WIF in which the terminal device is located, $I_x$ is a location of indication information corresponding to the terminal device in the $WIF_X$, $Z_{WIF_X}$ is a bit length of an $MRB_X$ corresponding to the $WIF_X$, the $WIF_i$ is an $i^{th}$ bitmap field, an $MRB_i$ is an $i^{th}$ information block field in the DCI, a location of the indication information is the location of the terminal device in the bitmap, and i and N are positive integers, or $$P = \sum_{i=0}^{N-1} L_i + \sum_{i=0}^{(X-offset-1)modN} W_{(offset+i)modN} Z_{(offset+i)modN} + Z_{WIF_X} * I_X,$$

wherein P is the transmission location, $L_i$ is a bit length of a wake-up signal indicator field ($WIF_i$), $W_{(offset+i)mod\ N}$ is a quantity of indication information in the $WIF_i$, $Z_{(offset+i)mod\ N}$ is a bit length of an information block in a monitoring and reception block ($MRB_i$), X is a number of a WIF in which the terminal device is located, $I_X$ is a location of indication information corresponding to the terminal device in the $WIF_X$, $Z_{WIF_X}$ is a bit length of an $MRB_X$ corresponding to the $WIF_X$, the $WIF_i$ is an $i^{th}$ bitmap field, an $MRB_i$ is an $i^{th}$ information block field in the DCI, a location of the indication information is the location of the terminal device in the bitmap, an offset is a start location that is randomly generated, N is a quantity of WIFs, and i and N are positive integers.

9. The apparatus according to claim 8, wherein the indication information is used to indicate a transmission location of each of the m information blocks.

10. The apparatus according to claim 8, wherein before the receiving DCI, the method further comprises:

receiving a configuration message, wherein the configuration message carries at least one of length information of the bitmap or location information of the bitmap in the DCI.

11. The apparatus according to claim 8, wherein the DCI is received from a network device.

12. The apparatus according to claim 8, wherein the b terminal devices support a discontinuous reception mechanism.

13. The apparatus according to claim 8, wherein the energy-saving information comprises at least one of a wake-up signal indication, a bandwidth part indication, or cross-slot scheduling.

14. The apparatus according to claim 8, wherein the DCI is received on a physical downlink control channel.

15. A communication apparatus, comprising:

a processor; and a computer-readable medium including computer-executable instructions that, when executed by the processor, cause the apparatus to carry out a method including:

determining downlink control information (DCI), wherein the DCI comprises indication information and m information blocks, the indication information is used to indicate b terminal devices, a first information block in the m information blocks corresponds to a first terminal device in the b terminal devices, the first information block is used to indicate energy-saving information of the first terminal device, a second information block in the m information blocks corresponds to a second terminal device in the b terminal devices, the second information block is used to indicate energy-saving information of the second terminal device, a length of the first information block is different from a length of the second information block, and m≤b, and wherein the DCI further comprises a compressed field that indicates a bitmap, and the bitmap corresponds to a combination of the b terminal devices that are to be woken up at the same time, wherein b is less than or equal to a maximum number of terminal devices in one cell that can be woken up at the same time at a pre-set probability;

obtaining the first information block based on a location of the first terminal device in the bitmap and a state of the bitmap; and sending the DCI, wherein the indication information indicates a transmission location of the first information block by using the location of the first terminal device in the bitmap and the state of the bitmap, and a mapping relationship between a transmission location and a location of a terminal device in the bitmap is one of the following:

$$P = \sum_{i=0}^{N-1} L_i + \sum_{i=0}^{X-1} W_i Z_i + Z_{WIF_X} * I_X,$$

wherein P is the transmission location, $L_i$ is a bit length of a wake-up signal indicator field ($WIF_i$), $W_i$ is a quantity of indication information in the $WIF_i$, $Z_i$ is a bit length of an information block in a monitoring and reception block ($MRB_i$), X is a number of a WIF in which the terminal device is located, $I_X$ is a location of indication information corresponding to the terminal device in the $WIF_X$, $L_{WIF_X}$ is a bit length of an $MRB_X$ corresponding to the $WIF_X$, the $WIF_i$ is an $i^{th}$ bitmap field, an $MRB_i$ is an $i^{th}$ information block field in the DCI, a location of the indication information is the location of the terminal device in the bitmap, and i and N are positive integers, or $$P = \sum_{i=0}^{N-1} L_i + \sum_{i=0}^{(X-offset-1)modN} W_{(offset+i)modN} Z_{(offset+i)modN} + Z_{WIF_X} * I_X,$$

wherein P is the transmission location, $L_i$ is a bit length of a wake-up signal indicator field ($WIF_i$), $W_{(offset+i)mod\ N}$ is a quantity of indication information in the $WIF_i$, $Z_{(offset+i)mod\ N}$ is a bit length of an information block in a monitoring and reception block ($MRB_i$), X is a number of a WIF in which the terminal device is located, $I_X$ is a location of indication information corresponding to the terminal device in the $WIF_X$, $Z_{WIF_X}$ is a bit length of an $MRB_X$ corresponding to the $WIF_X$, the WIF; is an $i^{th}$ bitmap field, an $MRB_i$ is an $i^{th}$ information block field in the DCI, a location of the indication information is the location of the terminal device in the bitmap, an offset is a start location that is randomly generated, N is a quantity of WIFs, and i and N are positive integers.

16. The communication apparatus according to claim 15, wherein the indication information is used to indicate a transmission location of each of the m information blocks.

17. The apparatus according to claim 15, wherein the communication apparatus is a network device.

18. The apparatus according to claim 15, wherein the b terminal devices support a discontinuous reception mechanism.

19. The apparatus according to claim 15, wherein the energy-saving information comprises at least one of a wake-up signal indication, a bandwidth part indication, or cross-slot scheduling.

20. The apparatus according to claim 15, wherein the DCI is sent on a physical downlink control channel.

* * * * *